US012755516B2

(12) United States Patent
Welsh et al.

(10) Patent No.: US 12,755,516 B2
(45) Date of Patent: Oct. 6, 2026

(54) DATA AUGMENTATION USING CONDITIONED GENERATIVE MODELS FOR SYNTHETIC CONTENT GENERATION

(71) Applicant: Nvidia Corporation, Santa Clara, CA (US)

(72) Inventors: John Welsh, Santa Clara, CA (US); Amit Goel, Fremont, CA (US)

(73) Assignee: Nvidia Corporation, Santa Clara, CA (US)

( * ) Notice: Subject to any disclaimer, the term of this patent is extended or adjusted under 35 U.S.C. 154(b) by 440 days.

(21) Appl. No.: 18/349,775

(22) Filed: Jul. 10, 2023

(65) Prior Publication Data

US 2025/0022256 A1 Jan. 16, 2025

(51) Int. Cl.

| | |
|---|---|
| ***G06V 10/774*** | (2022.01) |
| ***G06T 5/50*** | (2006.01) |
| ***G06T 7/194*** | (2017.01) |
| ***G06V 10/25*** | (2022.01) |
| ***G06V 10/82*** | (2022.01) |

(52) U.S. Cl.

CPC .............. *G06V 10/774* (2022.01); *G06T 5/50* (2013.01); *G06T 7/194* (2017.01); *G06V 10/25* (2022.01); *G06V 10/82* (2022.01); *G06T 2207/20221* (2013.01); *G06V 2201/12* (2022.01)

(58) Field of Classification Search

CPC ...... G06V 10/774; G06V 10/25; G06V 10/82; G06V 2201/12; G06T 5/50; G06T 7/194; G06T 2207/20221

See application file for complete search history.

(56) References Cited

U.S. PATENT DOCUMENTS 11,995,803 B1 * 5/2024 Karpman .................. G06T 5/70

FOREIGN PATENT DOCUMENTS

WO WO-2024233814 A1 * 11/2024 ........... G06N 3/0464

* cited by examiner

*Primary Examiner* — Vu Le
*Assistant Examiner* — Lei Zhao
(74) *Attorney, Agent, or Firm* — Hogan Lovells Cadwalader US LLP

(57) ABSTRACT

Synthetic data generation systems and methods are disclosed for augmenting synthetic scenes using neural networks that are conditioned on depth information. The synthetic data generation system may use a guided latent diffusion model to generate (or augment) synthetic images, which can subsequently be used to train other models to perform tasks such as object detection. Input of the model may be an image rendered by a graphic engine with coarsely rendered objects. When the image is rendered, segmentation masks may also be generated for objects in the image. The synthetic data generation system may generate a monocular depth image. During the image generation phase, the corresponding segmentation mask, depth map, and any guiding textual input serve as constraints for the denoising process. During the denoising step, the synthetic data generation system may also crop and adjust the resolution of individual objects during diffusion to enhance the results. The newly regenerated object is then blended back into the original image to produce a synthetic image.

20 Claims, 20 Drawing Sheets

300

520

510

DATA AUGMENTATION USING CONDITIONED GENERATIVE MODELS FOR SYNTHETIC CONTENT GENERATION

BACKGROUND

Machine learning, including the use of deep learning neural networks, has made significant advancements in fields such as of image generation and object recognition, influencing an increasing variety of industries. For instance, warehouses and logistics companies use image recognition technologies to recognize objects in images, such as identifying pallets, boxes, and even specific products, which aids in inventory management. However, these machine learning models require extensive labeled image datasets for training. The task of collecting and annotating large quantities of images can be labor-intensive, time-consuming, and even impractical in certain scenarios, particularly for objects that are unique or encountered infrequently. A lack of realistic and diverse training images for training neural networks can result in those networks being inaccurate when performing various tasks.

BRIEF DESCRIPTION OF THE DRAWINGS

Various embodiments in accordance with the present disclosure will be described with reference to the drawings, in which.

DETAILED DESCRIPTION

Figure 1A:
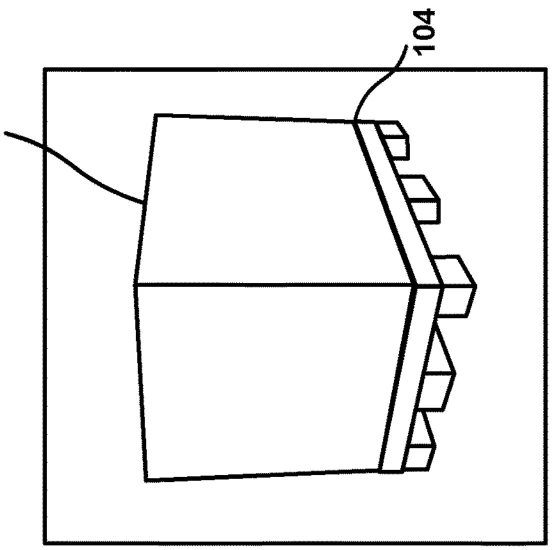
FIGS. 1A-1C illustrate synthetic images with portions of the image being substituted by new objects, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), generative or collaborative content creation, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations, systems for performing light transport simulation, systems for performing collaborative content creation for 3D assets, systems implemented at least partially using cloud computing resources, and/or other types of systems.

Approaches in accordance with various illustrative embodiments provide for a synthetic data generation and/or augmentation system that augments synthetic scenes using neural networks that are conditioned on depth information. In at least one embodiment, a synthetic data generation system can generate high-quality synthetic images based on a set of inputs while preserving the semantics of the original image. A guided latent diffusion model may be trained for use in a synthetic data generation system, such as to generate synthetic images with one or more different objects represented therein. One input to such a model can be an image rendered by a rendering engine with one or more coarsely rendered (e.g., lacking fine detail) objects. The rendering process can also generate one or more segmentation masks, including a mask for each object (or identified object of interest). A synthetic data generation system can generate a monocular depth image based on the rendered image, such as by using a separate trained machine learning (ML) model.

In at least one embodiment, it may be desirable to generate additional training data by replacing one or more of the objects in a synthetic training image. This may include replacing an object, modifying the appearance of an object, or adding an augmentation to the object, among other such options. One approach to generating an object with a different appearance is to use a denoising diffusion model. In a forward pass through the model the image data will have noise added, and then during a subsequent backward pass through the model the model can remove noise iteratively to result in an object being displayed that is different in appearance than the object that was in the rendered input image. In at least one embodiment, the noise removal or image regeneration by the diffusion model may include one or more conditions (or other such features, aspects, or processes, that may be used to guide the regeneration. These can include, for example and without requirement or limitation, a segmentation mask for the object being regenerated, the monocular depth map generated for the image, and any guiding input or prompts (e.g., text or speech input) that are to guide or constrain the denoising process, as may relate to a type, style, or appearance of an object to be regenerated. During the denoising step, a synthetic data generation system may crop portions of the input image based on the segmentation mask (e.g., delineating between foreground and background features) for a specific object, and adjust the resolution of those portions for use during the regeneration task using the diffusion model, in order to generate higher quality results.

At least one embodiment may use a blended latent diffusion approach, where the denoised latent for each step is multiplied by the foreground mask, with the denoised latent then being retained at that step. For the background, noise can be added to the original latent for that given step. Such an approach can ignore the result of denoising the previous step for the background. At each step the denoised foreground, and progressively shrinking noisy background, can be summed. Near an end of such an approach, the foreground is denoised and the background corresponds to the original input image.

A newly regenerated object can then be blended back into the original image to produce a synthetic image. By considering a cropped region with some padding around the object, any antialiasing or blending can be improved by blending the cropped region back into the image. Where multiple objects are to be replaced, modified, or augmented, the objects can be modified and blended back into the image one at a time, in sequence, in order to allow for more accurate and smooth blending, and avoid the introduction of artifacts by attempting to simultaneously blend together multiple objects rendered separately.

A synthetic data generation system in accordance with at least one embodiment may provide several technical advantages and improvements. For example, a synthetic data generation system can generate multiple different versions of objects in generated synthetic scenes using depth-conditioned generative models, while preserving the semantics of the original scene. Existing approaches that apply diffusion models for generating synthetic images often introduce undesirable artifacts that may distort the original scene's semantics due to a diffusion process. A synthetic data generation system offers a solution to such a challenge by addressing the problem using a variety of techniques. For example, a synthetic data generation system can incorporate region of interest (ROI) extraction before the diffusion process. A synthetic data generation system can preserve details for small objects in the scene by cropping and resizing regions of interest before applying the diffusion model. Generated synthetic image data for the ROI can then be blended back into the original image, which can help to ensure that the overall structure and composition of the scene are preserved, while maintaining the resolution and detail of the elements of interest within the image.

Additionally, a synthetic data generation system can integrate (iterative) segmentation mask guidance during a latent blended diffusion process. A synthetic data generation system in at least one embodiment can use segmentation masks from the rendered images to guide the diffusion process, thereby enhancing spatial control over areas where text prompts are applied in the augmented images. By using segmentation masks as a guidance, a synthetic data generation system can ensure that the specific regions of interest are accurately targeted and the synthesized augmentations accurately correspond to the desired text prompts.

Furthermore, a synthetic data generation system can preserve semantics of the original image by using depth information computed from the original image as guidance. Depth information can be calculated, in at least one embodiment, based on the original renderings instead of using the output from a prior augmentation stage. Rather than relying on the output from an earlier augmentation stage, the synthetic data generation system can compute depth information based on the original renderings. In scenarios involving recursive augmentations, the synthetic data generation system can prevent deviation from the depth of the original scene by using the original synthetic rendered image to calculate the monocular depth of the region of interest before initiating the diffusion process. With such features incorporated into the neural network training process, the synthetic data generation system can control multi-stage augmentations with precision, ensuring the output augmented data is not just an accurate (e.g., visually plausible or realistic) rendition but also consistent with the input (e.g., original rendered data) in terms of scene semantics. These techniques eliminate the need for labeling the augmented dataset as the synthetic data generation system uses the ground truth annotations from the original rendered scenes, significantly simplifying the process while maintaining data quality.

Variations of this and other such functionality can be used as well within the scope of the various embodiments as would be apparent to one of ordinary skill in the art in light of the teachings and suggestions contained herein.

Figure 1B:
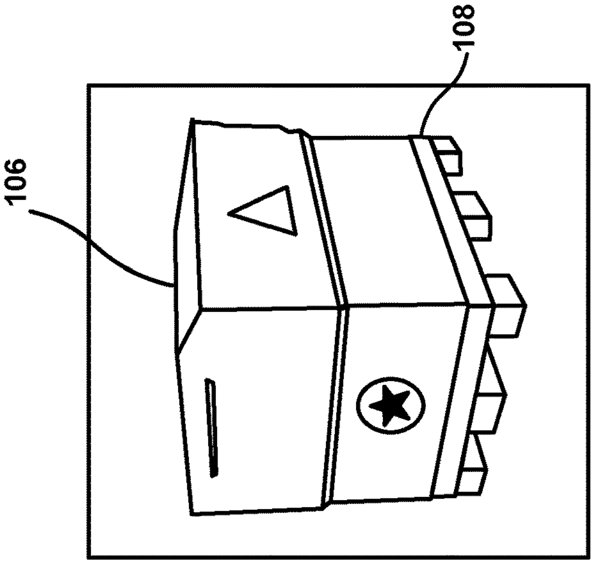
Figure 1C:
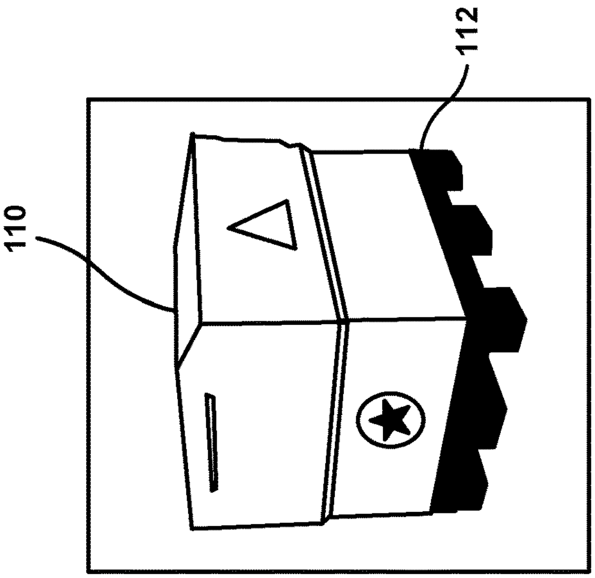

FIGS. 1A-1C illustrate a series of images in which certain portions are replaced by new objects, in accordance with various embodiments. FIG. 1A displays an image with a coarsely constructed 3D model, including a box 102 on a pallet 104 where both may lack fine detail. The ability to use coarse images as input can simplify the training data generation process by allowing an artist to generate an image having the desired content and semantics, without having to spend a lot of time on generating objects with realistic appearance. A synthetic data generation system can take such an image as input and generate one or more synthetic images based on, for example, specific text prompts (or voice prompts, gesture input, etc.). For instance, a text prompt may specify "a photo with military equipment." In response, a synthetic data generation system can generate a synthetic image as illustrated in FIG. 1B, which shows a military box 106 on top of the pallet 108, with the military box 106 replacing the original, coarse box 102 in the input. FIG. 1B preserves the composition and semantics of the original scene from FIG. 1A, ensuring that the overall integrity and semantic of the original image is preserved in the augmented image. In one embodiment, the synthetic data generation system may conduct recursive augmentation of synthetic images. For example, following the transition from FIG. 1A to FIG. 1B, another text prompt "a photo of black plastic pallet" may be provided to the synthetic data augmentation system. In response, the synthetic data generation system generates FIG. 1C, which does not significantly change the military box 110 through regeneration, but replaces the pallet 108 in FIG. 1B with a black plastic pallet 112 as illustrated in FIG. 1C.

Figure 2A:
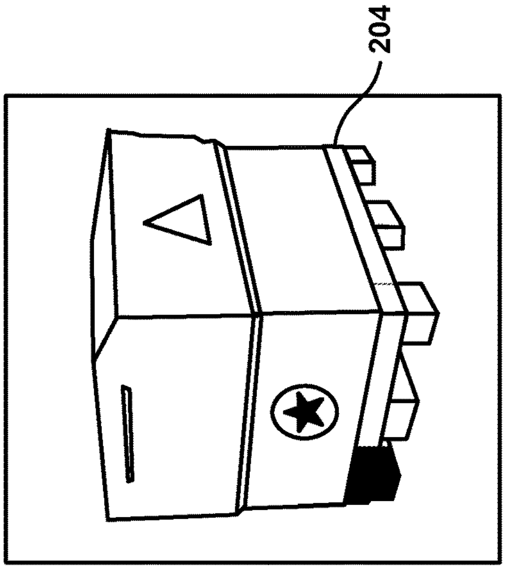
FIGS. 2A-2C illustrate images with a same object being substituted by variations of the same object, in accordance with various embodiments.
Figure 2B:
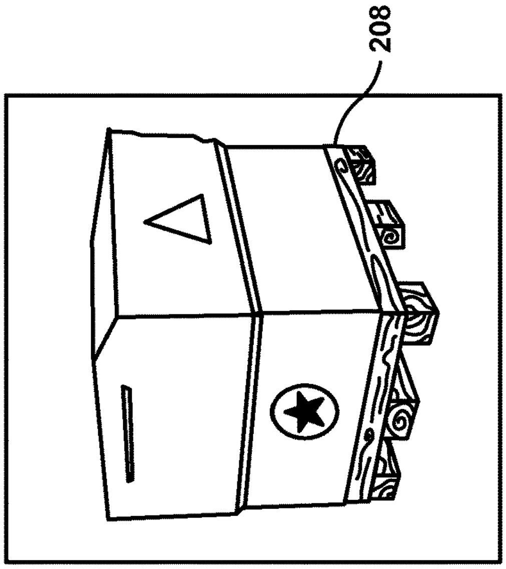
Figure 2C:
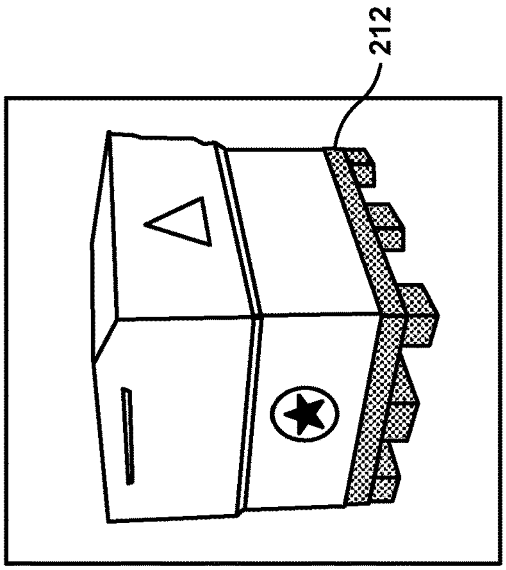

FIGS. 2A-2C illustrate images with a same object of the image being substituted by variations of the same object based on text prompts, in accordance with various embodiments. In this series of images, the object of interest—here a box with a pallet—undergoes a transformation. The synthetic data generation system can generate alternative versions based on, for example, the provided text prompt. For example, FIG. 2A illustrates a box resting on a metal pallet 204, based on a text prompt "a photo of a metal pallet." FIG. 2B illustrates an instance where the text prompt may have suggested "a photo of a wooden pallet." In response, the synthetic data generation system generates an image that retains the original box but now features it on a wooden pallet 208, effectively altering the material of the pallet while preserving the composition and semantics of the scene. In FIG. 2C, the scenario further evolves based on a different text prompt, possibly "a photo of a plastic pallet." The result is a synthetic image where the box now rests on a plastic pallet 212.

Figure 3:
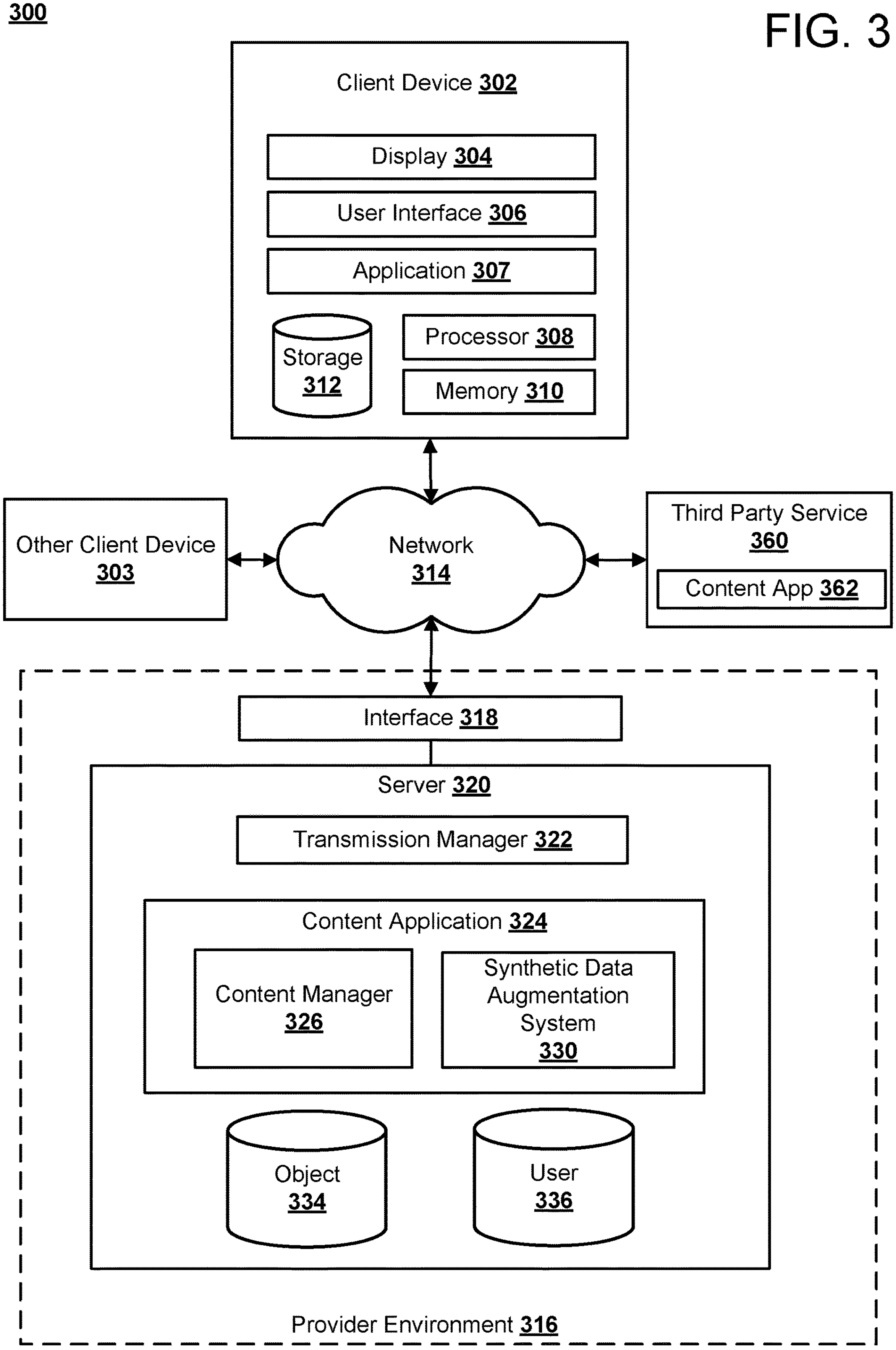
FIG. 3 illustrates an example system environment that includes a synthetic data augmentation system, in accordance with various embodiments.

FIG. 3 illustrates an example system that includes a synthetic data generation system, in accordance with various embodiments. As an example, FIG. 3 illustrates an example networked system 300 that can be used to provide, generate, modify, encode, process, and/or transmit image data or other such content. The example networked system 300 may include a client device 302, other client device 303, a network 314, a third party service 360, and a provider environment 316 that includes a synthetic data generation system 330.

The client device 302 may generate or receive data for a session using components of an application 307 on client device 302 and data stored locally on that client device 302. As an example, a user may use a client device 302 to generate synthetic images using the application 307. Although only one client device 302 is illustrated in detail, the networked system 300 may include one or more other client devices 303 that can communicate with the provider environment 316 through network 314. A client device 302 may be any appropriate computing device capable of allowing a user to generate synthetic images as discussed herein, such as may include a desktop computer, notebook computer, computer workstation, gaming console, set-top box, streaming device, smartphone, tablet computer, VR headset, AR goggles, wearable computer, or a smart television. In at least one embodiment, a user can generate synthetic images using a user interface (UI) 306 running on a client device 302, although at least some functionality may also operate on a remote device, networked device, or through a cloud computing platform. In at least one embodiment, a user can provide input to the UI 306, such as through a touch-sensitive display 304 or by moving a mouse cursor displayed on a display screen. In one embodiment, a user may be able to provide inputs such as images and text prompts for generating synthetic images, labels, training dataset, supervising datasets to an application 307. The application 307 may be provided by the provider environment 316 for the user to download on the client device 302. In at least one embodiment, a client device can include at least one processor 308 (e.g., a CPU or GPU) and a memory 310 to execute application 307 and/or perform tasks on behalf of application 307. In at least one embodiment, synthetic images generated through the application 307 can be stored locally to local storage 312.

In one embodiment, each client device 302 can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by allowing the client devices to interact with servers that are in closer proximity, while also improving security of resources in the cloud provider environment.

The network 314 may represent the communication pathways among the client device 302, the provider environment 316, other client device 303, and the third party service 360. Through the network 314, the client device 302 may send input information associated with synthetic image generation over network 314. The information may be received by a remote computing system, as may be part of a resource provider environment 316. In one embodiment, the network 314 is the Internet. The network 314 can include any appropriate network, including an intranet, Internet, a cellular network, a local area network (LAN), or any other such network or combination, and communication over a network can be allowed via wired and/or wireless connections. The network 314 can also use dedicated or private communication links that are not necessarily part of the Internet. In one embodiment, the network 314 uses standard communications technologies and/or protocols. Thus, the network 314 can include links using technologies such as Ethernet, Wi-Fi, integrated services digital network (ISDN), digital subscriber lines (DSL), asynchronous transfer mode (ATM), etc. Similarly, the networking protocols used on the network 314 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, such as long tern evolution (LTE). The data exchanged over the network 314 can be represented using technologies or formats including the hypertext markup language (XML), the wireless access protocol (WAP), the short message service (SMS) etc. In addition, all or some of the links can be encrypted using conventional encryption technologies such as the secure sockets layer (SSL), secure HTTP or virtual private networks (VPNs). In another embodiment, the client device 302 can use custom and/or dedicated data communications technologies instead of, or in addition to, the ones described above.

The provider environment 316 may include any appropriate components for receiving requests and returning information or performing actions in response to those requests. In the embodiment illustrated in FIG. 3, the provider environment 316 may include an interface 318, and a server 320 that include various components for performing tasks associated with generating synthetic images. In at least one embodiment, the provider environment 316 might include Web servers and/or application servers for receiving and processing requests, then returning data or other content or information in response to a request.

The interface 318 may receive communications to the server 320. In at least one embodiment, interface 318 can include application programming interfaces (APIs) or other exposed interfaces allowing a user to submit requests to the server 320. In at least one embodiment, the interface 318 can include other components as well, such as at least one Web server, routing components, or load balancers. In at least one embodiment, components of an interface 318 can determine a type of request or communication, and can direct a request to an appropriate system or service such as the synthetic data generation system 330.

The server 320 may include a transmission manager 322, a content application 324, an object repository 334, and a user database 336. The server 320 may receive requests and data from the client device 302, perform tasks associated with the requests, and send results or other data to the client device 302. In at least one embodiment, a content application 324 executing on the server 320 (e.g., a cloud server or edge server) may initiate a session associated with the client device 302, as may use a session manager and user data stored in a user database 336, and can cause content such as one or more object representations—such as images—from an object repository 334 to be selected by a content manager 326 for processing. At least a portion of the generated content, such as synthetic images generated from the synthetic data generation system 330, may be transmitted to the client device 302 using an appropriate transmission manager 322 to send by download, streaming, or another such transmission channel. An encoder may be used to encode and/or compress at least some of this data before transmitting to the client device 302. In at least one embodiment, the client device 302 receiving such content can provide this content to a corresponding application 307 for selecting, providing, synthesizing, modifying, or using content for presentation (or other purposes) on or by the client device 302. A decoder may also be used to decode data received over the network 314 for presentation via client device 302, such as image or video content through a touch-sensitive display 304. In at least one embodiment, at least some of the content may already be stored on, rendered on, or accessible to client device 302 such that transmission over network 314 is not required for at least that portion of content, such as where the content may have been previously downloaded or stored locally on a hard drive or optical disk. In at least one embodiment, a transmission mechanism such as data streaming can be used to transfer the content from server 320, or user database 336, to client device 302. In at least one embodiment, at least a portion of this content can be obtained, enhanced, and/or streamed from another source, such as a third party service 360 or other client device 303, that may also include a content application 362 for generating, enhancing, or providing content. In at least one embodiment, portions of this functionality can be performed using multiple computing devices, or multiple processors within one or more computing devices, such as may include a combination of CPUs and GPUs.

In at least one embodiment, the server 320 may include a processor such as a central processing unit (CPU). In at least one embodiment, however, resources in such environments can use GPUs to process data for at least certain types of requests. In at least one embodiment, with thousands of cores, GPUs are designed to handle substantial parallel workloads and, therefore, have become popular in deep learning for training neural networks and generating predictions. In at least one embodiment, while use of GPUs for offline builds has allowed faster training of larger and more complex models, generating predictions offline implies that either request-time input features cannot be used or predictions must be generated for all permutations of features and stored in a lookup table to serve real-time requests. In at least one embodiment, if a deep learning framework supports a CPU-mode and a model is small and simple enough to perform a feed-forward on a CPU with a reasonable latency, then a service on a CPU instance could host a model. In at least one embodiment, training can be done offline on a GPU and inference done in real-time on a CPU. In at least one embodiment, if a CPU approach is not a viable option, then a service can run on a GPU instance. In at least one embodiment, because GPUs have different performance and cost characteristics than CPUs, however, running a service that offloads a runtime algorithm to a GPU can require it to be designed differently from a CPU based service The server 320 may include a content application 324 that includes a content manager 326 and a synthetic data generation system 330. As discussed previously, the content manager 326 may send objects, such as images, from the object repository 334 along with requests and other data from the client device 302 to the synthetic data generation system 330 for generating synthetic images. The synthetic data generation system 330 may generate synthetic images and provide the results to the transmission manager 322 for sending back to the client device 302. The synthetic data generation system 330 may also use local datasets or datasets provided by the third party service 360 for training machine learning models that can generate synthetic images and store the trained models to a model repository. Functionality associated with the synthetic data generation system 330 is discussed in greater detail in accordance with FIG. 4.

Figure 4:
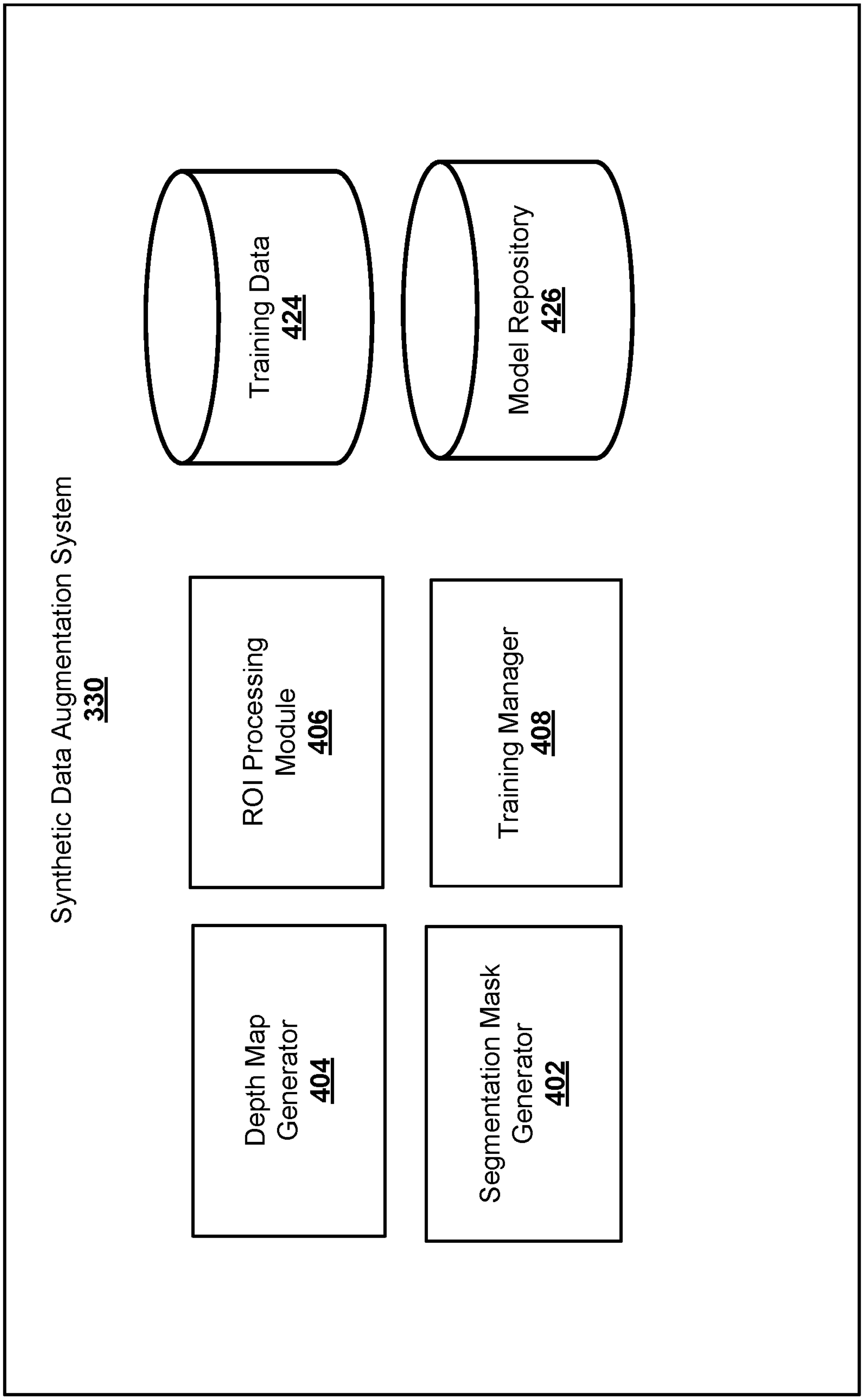
FIG. 4 illustrates an example block diagram illustrating modules in the synthetic data augmentation system, in accordance with various embodiments.

FIG. 4 illustrates an example block depicting various modules in an example synthetic data generation system, in accordance with at least one embodiment. The synthetic data generation system 330 may include a segmentation mask generator 402 that automatically generates segmentation masks based on rendered images (although as mentioned in at least one embodiment a segmentation mask may be provided by the renderer of an initial input image), a depth data generator 404 that computes (or obtains, e.g., from an external source) depth information, an ROI processing module 406 that extracts and/or resize ROI from an image, and a training manager 408 that manages a training pipeline for generating synthetic images (although training may also be separate from the system in at least one embodiment). In alternative configurations, different and/or additional components may be included in a synthetic data generation system 330. Each module of the synthetic data generation system 330 is discussed in greater detail in accordance with FIGS. 5-8.

Figure 5:
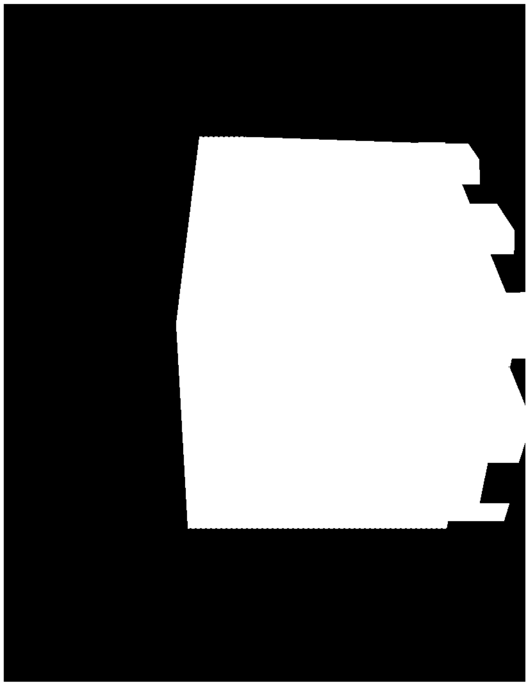
FIG. 5 illustrates an example depth map generated based on an input image, in accordance with various embodiments.
Figure 5:
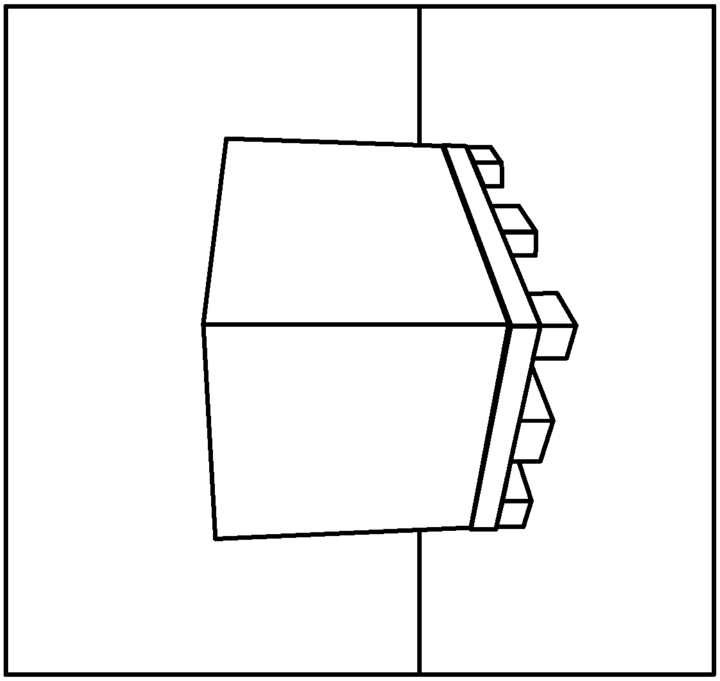

A depth map generator 404 may generate a depth map based on the input image. In one embodiment, the depth map generator 404 may use a monocular depth model to generate a depth map 520 that represents the relative depth between objects in an image 510 of the scene. As an example, FIG. 5 illustrates a depth map generated by a depth map generator 404 based on an input image, in accordance with various embodiments. The monocular depth image 520 is generated based on the input image 510. The depth image 520 presents a visual illustration of spatial relationships and relative distances between different objects within the input image 510. The depth map generator 404 may use a monocular depth model to compute the monocular depth data based on the input image. In one embodiment, the synthetic data generation system 330 may produce a sequence of synthetic image augmentations, with different objects being substituted based on the synthetic image generated in a previous stage. During the sequence of multiple augmentations, the depth map generator 404 may use the depth computed from the initial synthetic rendering, instead of recomputing it at each subsequent stage, which may preserve the details of objects within the scene. In one embodiment, the generated depth maps are stored in the model repository 426. The depth data computed by the depth map generator 404 is used as guidance in the synthetic image generation process by the training manager 408, which is discussed in detail in accordance with FIG. 8.

Continuing with the discussion of FIG. 4, the segmentation mask generator 402 may generate segmentation masks, if not received with the rendered images, which can be used as constraints in synthetic image augmentation. In at least one embodiment, the segmentation masks are stored in the model repository 426. The segmentation mask generator 402 may generate segmentation masks when the original input image is generated, with the original image rendered by a standard graphics engine. The original image may include objects such as 3D objects or a coarse model of background or objects. The generated segmentation masks are subsequently used as constraints during synthetic image augmentation. The segmentation mask generator 402 may derive the segmentation masks directly from the synthesis process, thereby eliminating the need for manual annotation of segmentation masks. Example illustrations of generated segmentation masks are depicted in FIGS. 6A-6F.

Figure 6A:
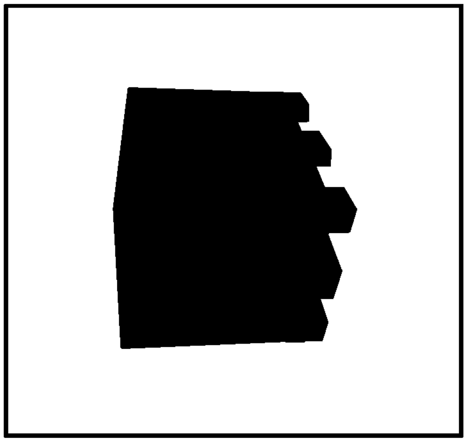
FIGS. 6A-6F illustrate example segmentation masks generated based on input images, in accordance with various embodiments.
Figure 6B:
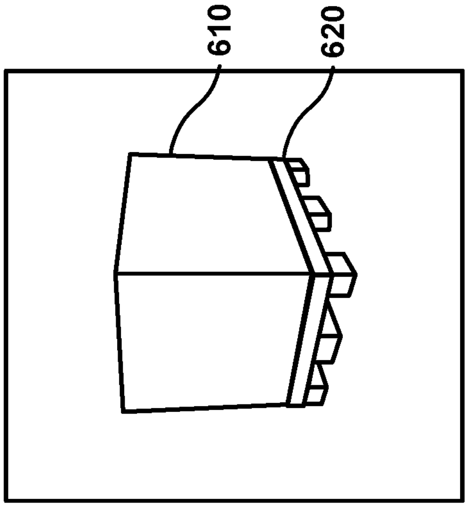
Figure 6C:
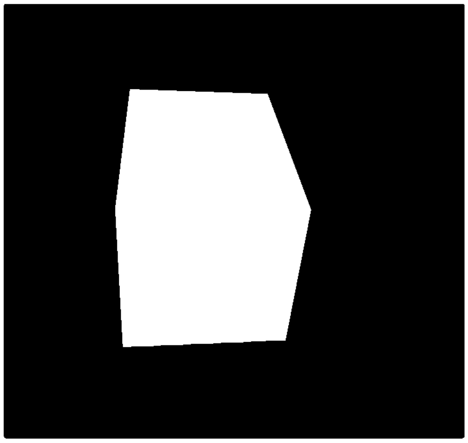
Figure 6D:
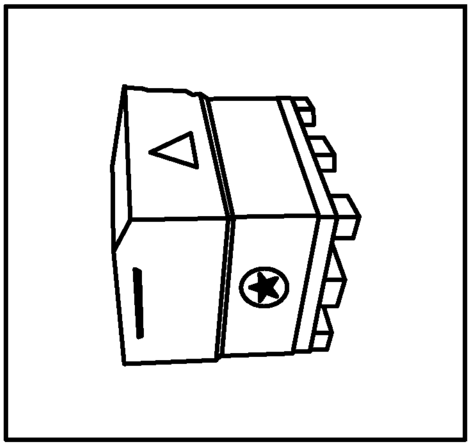
Figure 6E:
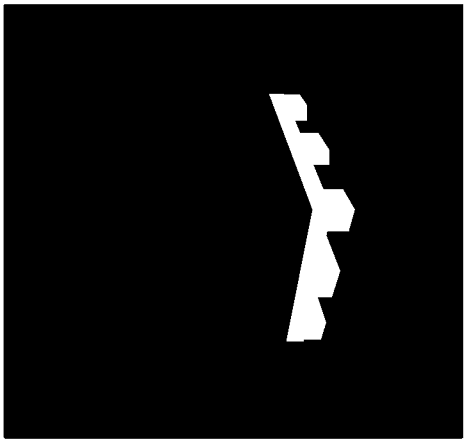
Figure 6F:
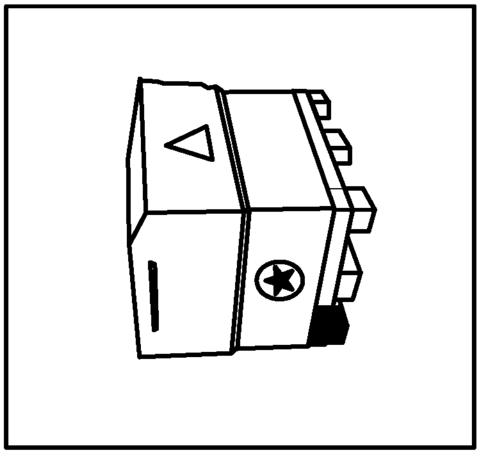

FIGS. 6A-6F illustrate example input images and segmentation masks generated based on the input image, in accordance with various embodiments. In one embodiment, the input image may be a coarse 3D image that includes elements such as a 3D box and a coarse model of a pallet with a background (e.g., 510 illustrated in FIG. 5), with the rendered elements provide a basic illustration of the objects present. The segmentation mask generator 402 may generate segmentation masks based on different regions of interest as a target for image augmentation. The segmentation masks outline specific regions or areas within the image where augmentation is intended to occur. For example, FIG. 6A may be a segmentation mask for background of an image generated based on the original rendered image. In FIG. 6A, the background of the image is marked with a segmentation mask (illustrated with a diagonally striped pattern), which signifies that the background is the target area for synthesis in the synthetic model. Consequently, the synthetic model would focus on generating variations or modifications within the defined background area, leaving other non-masked regions of the image unaffected. FIG. 6B presents an image of a box 610 on a pallet 620 that is the result of a synthetic process, which was guided by the segmentation mask shown in FIG. 6A, with the augmentation process only applied to the background of the image in FIG. 6B. Similarly, FIG. 6C displays a segmentation mask specifically applied to the box within the image. FIG. 6D demonstrates a synthetic image where only the box has been replaced with a variant, in this case, a military box. In a similar fashion, FIG. 6E depicts a segmentation mask that is applied exclusively over the pallet in the image. FIG. 6F presents an image where the original pallet has been replaced by a variant, such as a metal pallet. The segmentation mask generator 402 generates segmentation masks, which are used in the synthetic process to be more focused and precise, as the synthetic alterations are confined only to the regions marked by the masks, allowing more control over the areas within the image that are subject to modification. The segmentation masks are also used as a guidance for ROI extraction and aid in blending the newly generated object with the original image during the augmentation phase. Application of segmentation masks in the training process is discussed in detail in accordance with FIG. 8.

Referring back to FIG. 4, the ROI processing module 406 may extract regions of interest from an input image. The ROI processing module 406 may crop and resize regions of interest before applying mask-guided diffusion to better preserve details for small objects in the scene. The ROI processing module 406 uses segmentation masks to determine the boundaries of these regions of interest, which aids in the cropping of ROIs. The region of interest is determined based on the rendered segmentation mask. The ROI processing module 406 may create a bounding box around the area of interest and crop the area of interest. The ROI processing module 406 may further preserve paddings around the cropped region to include contextual information from surroundings of the targeted object for a better blending when the newly generated image is augmenting back into the background. Example ROI extractions of images are illustrated in accordance with FIGS. 7A-7D.

Figure 7A:
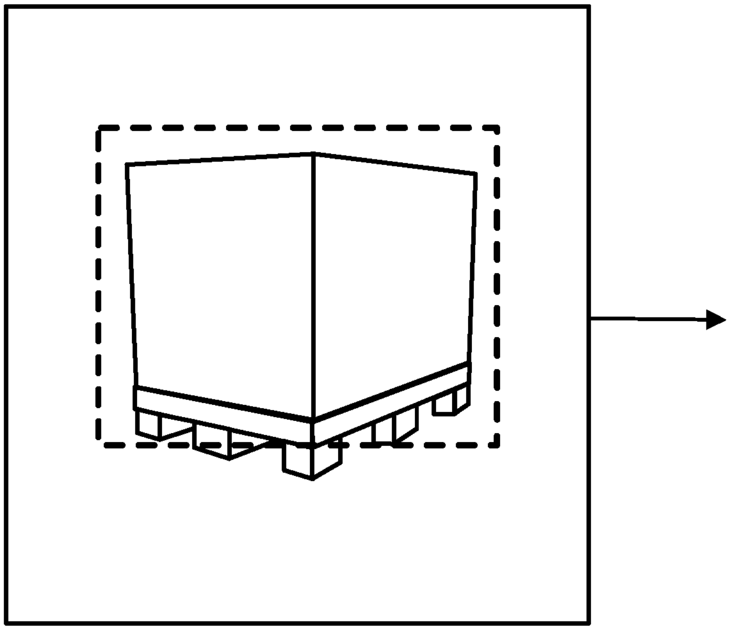
FIGS. 7A-7D illustrate an example ROI (region of interest) generation process, in accordance with various embodiments.
Figure 7B:
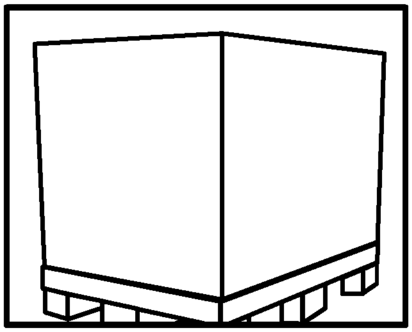
Figure 7C:
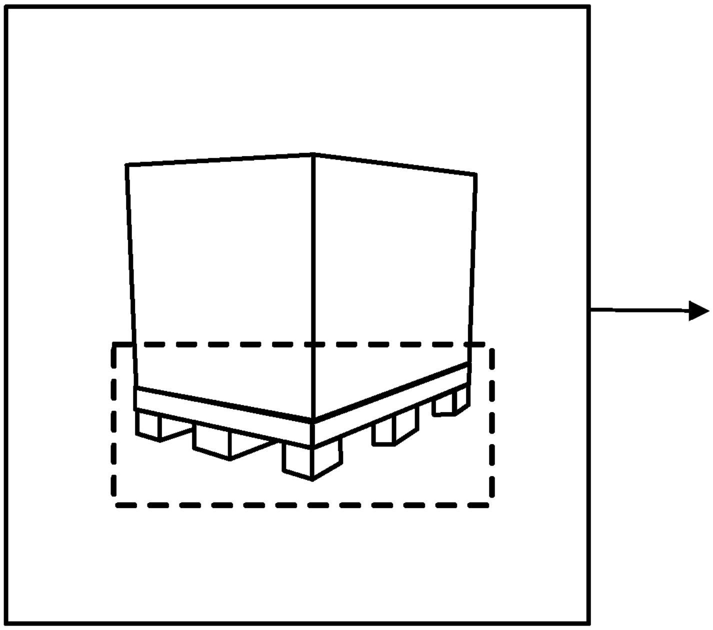
Figure 7D:
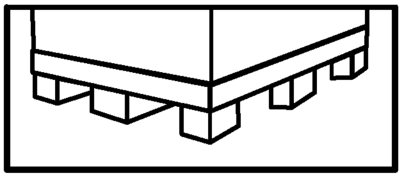

FIGS. 7A-7D demonstrate an example of a Region of Interest (ROI) generation process performed by the ROI processing module 406, in accordance with various embodiments. FIG. 7A displays an input image, wherein the box is the object of interest. FIG. 7B shows a cropped image emphasizing the box, with some padding 702 retained around the box to include contextual information. The ROI processing module 406 may preserve some padding (e.g., a specified number or a range of pixels around the segmentation masks) to achieve a more natural blend when the cropped portion is re-rendered and reintegrated into the original image. Similarly, FIG. 7C presents an input image, with the pallet 704 being the object of interest. Correspondingly, FIG. 7D exhibits a cropped image encompassing the pallet, along with some padding 706 preserved around it. During the synthetic image augmentation process, the image in FIG. 7D would be re-rendered based on text prompts and subsequently blended back into the background of FIG. 7C. In accordance with at least one embodiment, the ROI processing module 406 may resize the cropped region to a specific dimension. The ROI processing module 406 may resize the cropped region to a higher dimension for preservation of important details and characteristics related to the objects (e.g., small objects) before passing the cropped ROI into the image synthetic model as illustrated in FIG. 8.

Figure 8:
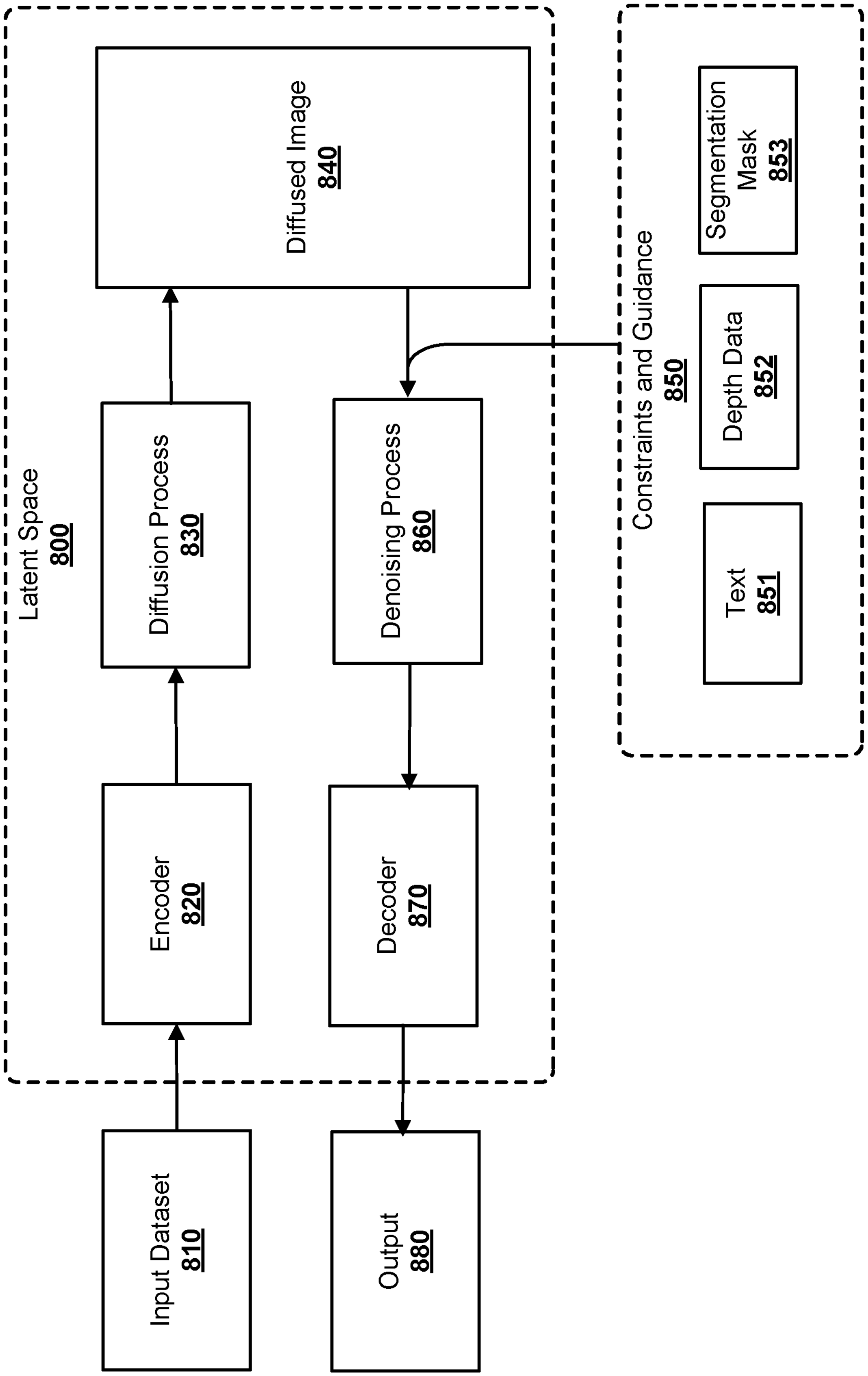
FIG. 8 illustrates an example process for training and using neural networks to generate synthetic images, in accordance with various embodiments.

FIG. 8 illustrates an example architecture for a neural network that can generate synthetic images, in accordance with various embodiments. The input dataset 810 may contain input images for synthetic image generation and/or augmentation. For example, the input dataset 810 may include an image generated by a 3D image generating engine containing coarse elements to be included in the image, such as a background and a foreground containing objects such as a 3D box on top of a pallet. The input images, in one embodiment, may be stored in the training data 424. Along with the generated image, the segmentation mask generator 402 may generate segmentation masks 853 which are used as conditioning in a later stage of the training process. The input image may be an ROI extracted by the ROI processing module 406 from an original rendered image, focusing on an object of interest. The ROI processing module 406 may further resize the extracted (e.g., cropped image) to a higher resolution for preservation of more details for objects of interest. The input image may be passed to an encoder 820 which maps the input image in to a latent space 800. As used herein, the latent space 800 may refer to a compressed, abstract representation of the input data and the compressed representation is learned by the model during its training process. The encoder 820 may reduce the dimension of the input image (e.g., from 512×512 to 64×64).

The compressed representation outputted from the encoder 820 may go through a diffusion process 830. The diffusion process 830 may add noise to the latent encoded representation, resulting in a diffused image 840. The diffused image 840 may go through a denoising process 860, which aims to recover the image before the noise-adding process. The denoising process 860 may take a noisy latent image representation, and a number of constraints and guidance for recovering the original image. In one embodiment, the training manager 408 may use text 851 inputs as a constraint. For example, as the examples illustrated in FIGS. 1-2, a text prompt may be "a photo with a wooden pallet." The text may be passed through a text encoder, which encodes the texts into embeddings, which are abstract representations of the texts. The embeddings are then passed to the denoising process 860 along with the diffused image 840. In at least one embodiment, the training manager 408 may also use depth data 852 extracted by the depth map generator 404 as an additional conditioning for the denoising process 860. The training manager 408 may use the depth data 852 to preserve the relative depth between objects in the originally rendered image, thereby producing an image that has similar semantics of the original image. In one embodiment, the training manager 408 may also use segmentation masks 853 generated by the segmentation mask generator 402 as a guidance in the denoising process 860. The segmentation masks 853 may specify which regions of the image should be preserved and which can be augmented. For instance, the masks can constrain the background to remain the same while allowing changes in the foreground, which helps to focus the model on specific regions of interest.

In one embodiment, the denoising process 860 may use a denoising U-Net including multiple channels of cross attention units. The denoising U-Net may include a U-shaped architecture, including a contracting path (e.g., an encoder) to capture context and a symmetric expanding path (e.g., a decoder) for localization. The denoising U-Net may include multiple channels of cross-attention units for performing deep learning tasks. The cross-attention units may allow the deep learning model to condition on different types of data (e.g., text, audio, or other non-image data) used as input when generating the output. Incorporating cross-attention units into the U-Net would allow the network to pay attention to different parts of the noisy input when generating the denoised output. In one or more embodiments, input that consists data of the same or another image type (e.g., depth maps) may be concatenated with an input (noisy latent) image.

The images that have undergone denoising by process 860 are sent to a decoder 870, which converts the latent representations of the denoised images into output 880. The outputs 880 are newly generated images produced by the model based on the constraints and guidance 850 given to the mask-guided diffusion. The outputs 880 are then augmented 890 back into the original image. In one embodiment, the training manager 408 may directly incorporate the entire rectangular region (e.g., cropped region) back into the image. In one embodiment, the newly generated image (e.g., output 880) can be smoothly blended back into the image using the segmentation mask, ensuring a seamless transition between the newly generated and the original parts of the image.

Figure 9:
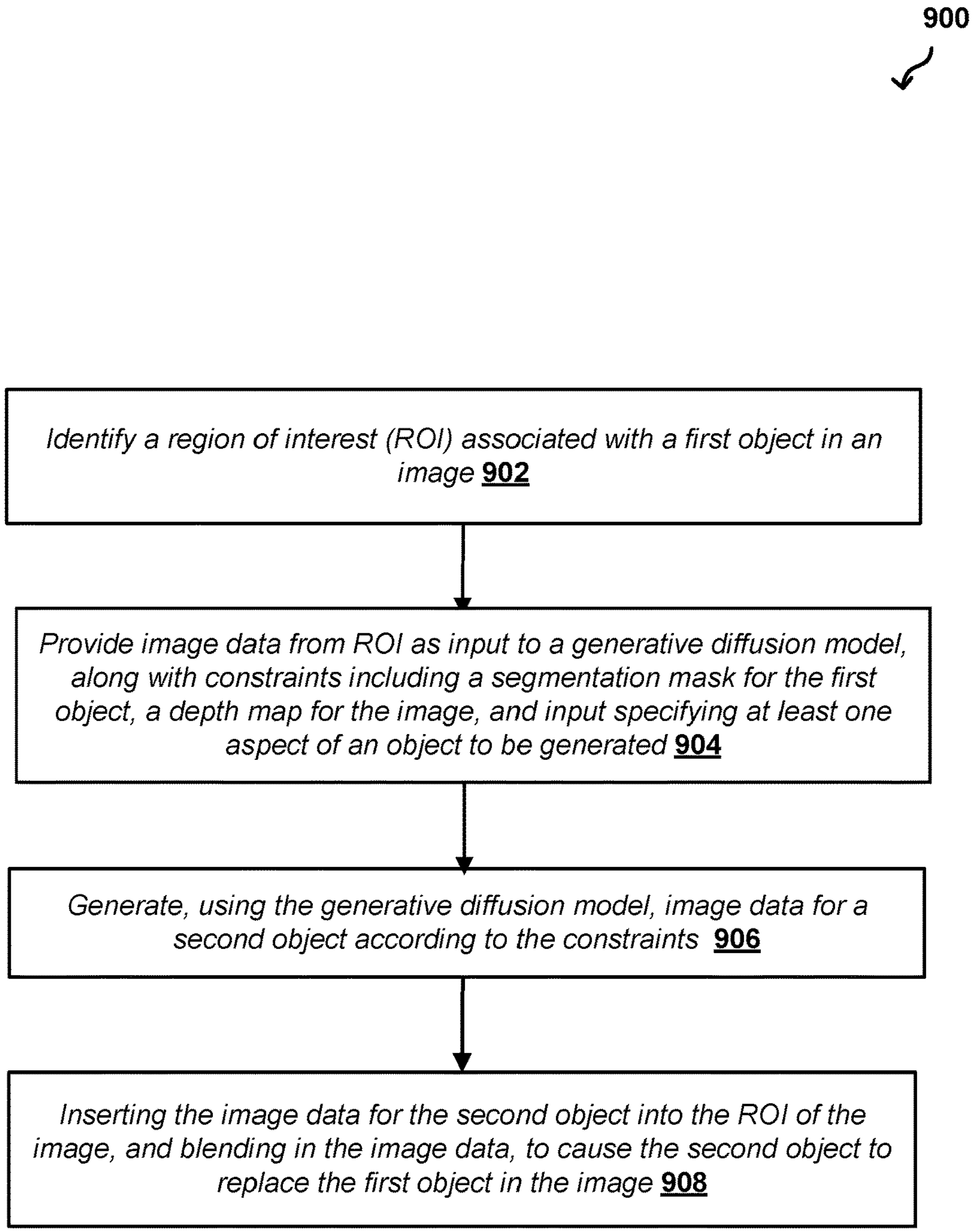
FIG. 9 illustrates an example process for generating synthetic images, in accordance with various embodiments.

FIG. 9 illustrates an example process 900 for generating synthetic images, in accordance with various embodiments. Example process 900 may start with an ROI processing module identifying 902 a region of interest (ROI) associated with a first object in an image. The image may be an input image rendered by a graphics engine. The image data form the ROI can be provided 904 as input to a generative diffusion model, along with one or more constraints, such as a segmentation mask for the first object, a depth map for the image, and/or input specifying at least one aspect of an object to be generated or annotated, among other such options. A synthetic data generation system can generate 906, using a generative diffusion model, image data for a second object according to the provided constraint(s) starting from pixel data from the ROI as input. A synthetic data generation system can then insert 908 the image data for the second object into the ROI of the image, blending in the image data to cause the second object to replace the first object in the image. If there are additional objects to be generated, replaced, or augmented, then the image data for these objects can be generated for the respective ROIs and blended into the image individually and in sequence to provide for smoother blending in the final image.

Inference and Training Logic

Figure 10A:
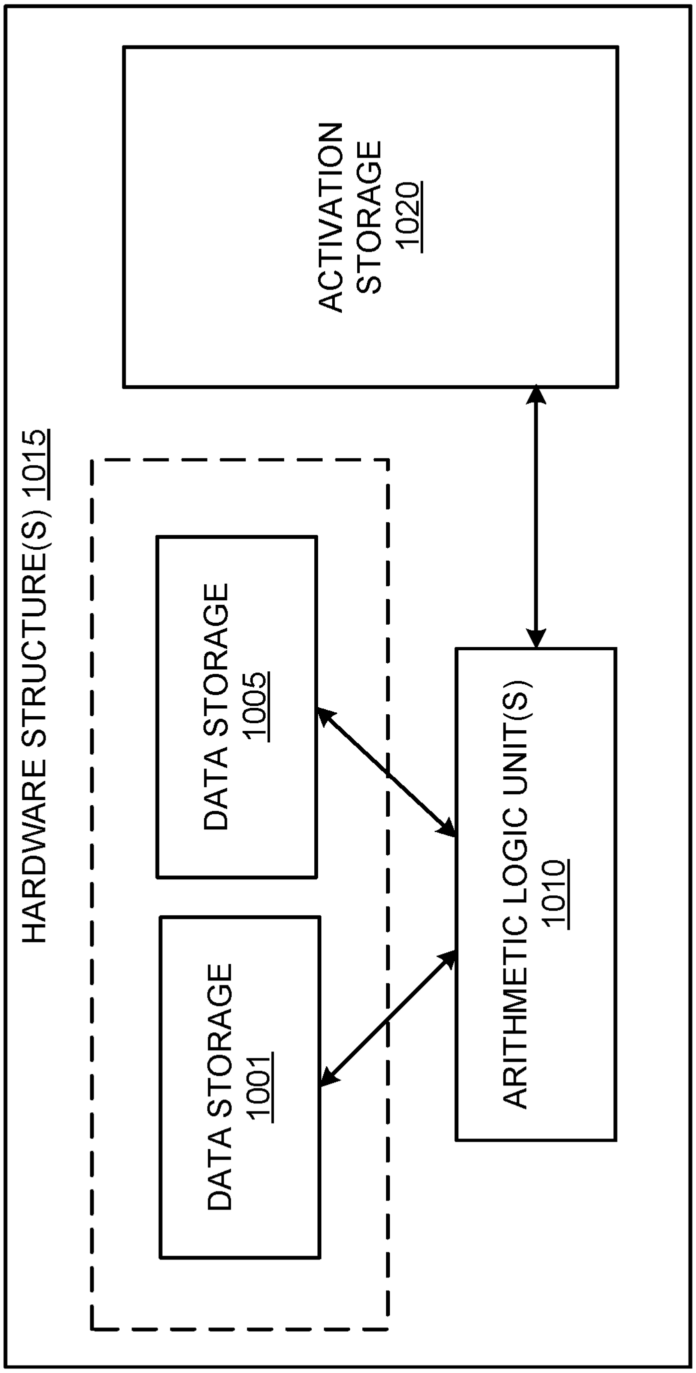
FIG. 10A illustrates inference and/or training logic, according to at least one embodiment.

FIG. 10A illustrates inference and/or training logic 1015 used to perform inferencing and/or training operations associated with one or more embodiments. Details regarding inference and/or training logic 1015 are provided below in conjunction with FIGS. 10A and/or 10B.

In at least one embodiment, inference and/or training logic 1015 may include, without limitation, code and/or data storage 1001 to store forward and/or output weight and/or input/output data, and/or other parameters to configure neurons or layers of a neural network trained and/or used for inferencing in aspects of one or more embodiments. In at least one embodiment, training logic 1015 may include, or be coupled to code and/or data storage 1001 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 1001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1001 may be included with other on-chip or off-chip data storage, including a processor's L1, L2, or L3 cache or system memory.

In at least one embodiment, any portion of code and/or data storage 1001 may be internal or external to one or more processors or other hardware logic devices or circuits. In at least one embodiment, code and/or data storage 1001 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 1001 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1015 may include, without limitation, a code and/or data storage 1005 to store backward and/or output weight and/or input/output data corresponding to neurons or layers of a neural network trained and/or used for inferencing in aspects of one or more embodiments. In at least one embodiment, code and/or data storage 1005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1015 may include, or be coupled to code and/or data storage 1005 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1005 may be included with other on-chip or off-chip data storage, including a processor's L1, L2, or L3 cache or system memory. In at least one embodiment, any portion of code and/or data storage 1005 may be internal or external to on one or more processors or other hardware logic devices or circuits. In at least one embodiment, code and/or data storage 1005 may be cache memory, DRAM, SRAM, non-volatile memory (e.g., Flash memory), or other storage. In at least one embodiment, choice of whether code and/or data storage 1005 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1001 and code and/or data storage 1005 may be separate storage structures. In at least one embodiment, code and/or data storage 1001 and code and/or data storage 1005 may be same storage structure. In at least one embodiment, code and/or data storage 1001 and code and/or data storage 1005 may be partially same storage structure and partially separate storage structures. In at least one embodiment, any portion of code and/or data storage 1001 and code and/or data storage 1005 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1020 that are functions of input/output and/or weight parameter data stored in code and/or data storage 1001 and/or code and/or data storage 1005. In at least one embodiment, activations stored in activation storage 1020 are generated according to linear algebraic and or matrix-based mathematics performed by ALU(s) 1010 in response to performing instructions or other code, wherein weight values stored in code and/or data storage 1001 and/or code and/or data storage 1005 are used as operands along with other values, such as bias values, gradient information, momentum values, or other parameters or hyperparameters, any or all of which may be stored in code and/or data storage 1001 or code and/or data storage 1005 or another storage on or off-chip.

In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALU(s) 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1001, code and/or data storage 1005, and activation storage 1020 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., Flash memory), or other storage. In at least one embodiment, activation storage 1020 may be completely or partially within or external to one or more processors or other logical circuits. In at least one embodiment, choice of whether activation storage 1020 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1015 illustrated in FIG. 10A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10A may be used in conjunction with central processing unit ("CPU") hardware, graphics processing unit ("GPU") hardware or other hardware, such as field programmable gate arrays ("FPGAs").

Figure 10B:
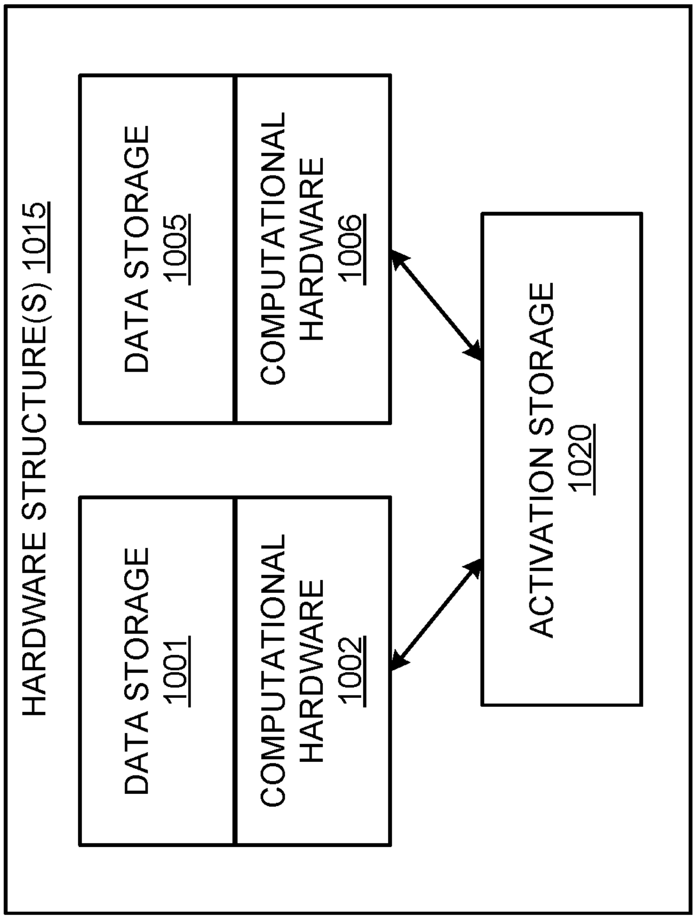
FIG. 10B illustrates inference and/or training logic, according to at least one embodiment.

FIG. 10B illustrates inference and/or training logic 1015, according to at least one or more embodiments. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10B may be used in conjunction with central processing unit (CPU) hardware, graphics processing unit (GPU) hardware or other hardware, such as field programmable gate arrays (FPGAs). In at least one embodiment, inference and/or training logic 1015 includes, without limitation, code and/or data storage 1001 and code and/or data storage 1005, which may be used to store code (e.g., graph code), weight values and/or other information, including bias values, gradient information, momentum values, and/or other parameter or hyperparameter information. In at least one embodiment illustrated in FIG. 10B, each of code and/or data storage 1001 and code and/or data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in code and/or data storage 1001 and code and/or data storage 1005, respectively, result of which is stored in activation storage 1020.

In at least one embodiment, each of code and/or data storage 1001 and 1005 and corresponding computational hardware 1002 and 1006, respectively, correspond to different layers of a neural network, such that resulting activation from one "storage/computational pair 1001/1002" of code and/or data storage 1001 and computational hardware 1002 is provided as an input to "storage/computational pair 1005/1006" of code and/or data storage 1005 and computational hardware 1006, in order to mirror conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage computation pairs 1001/1002 and 1005/1006 may be included in inference and/or training logic 1015.

Data Center

Figure 11:
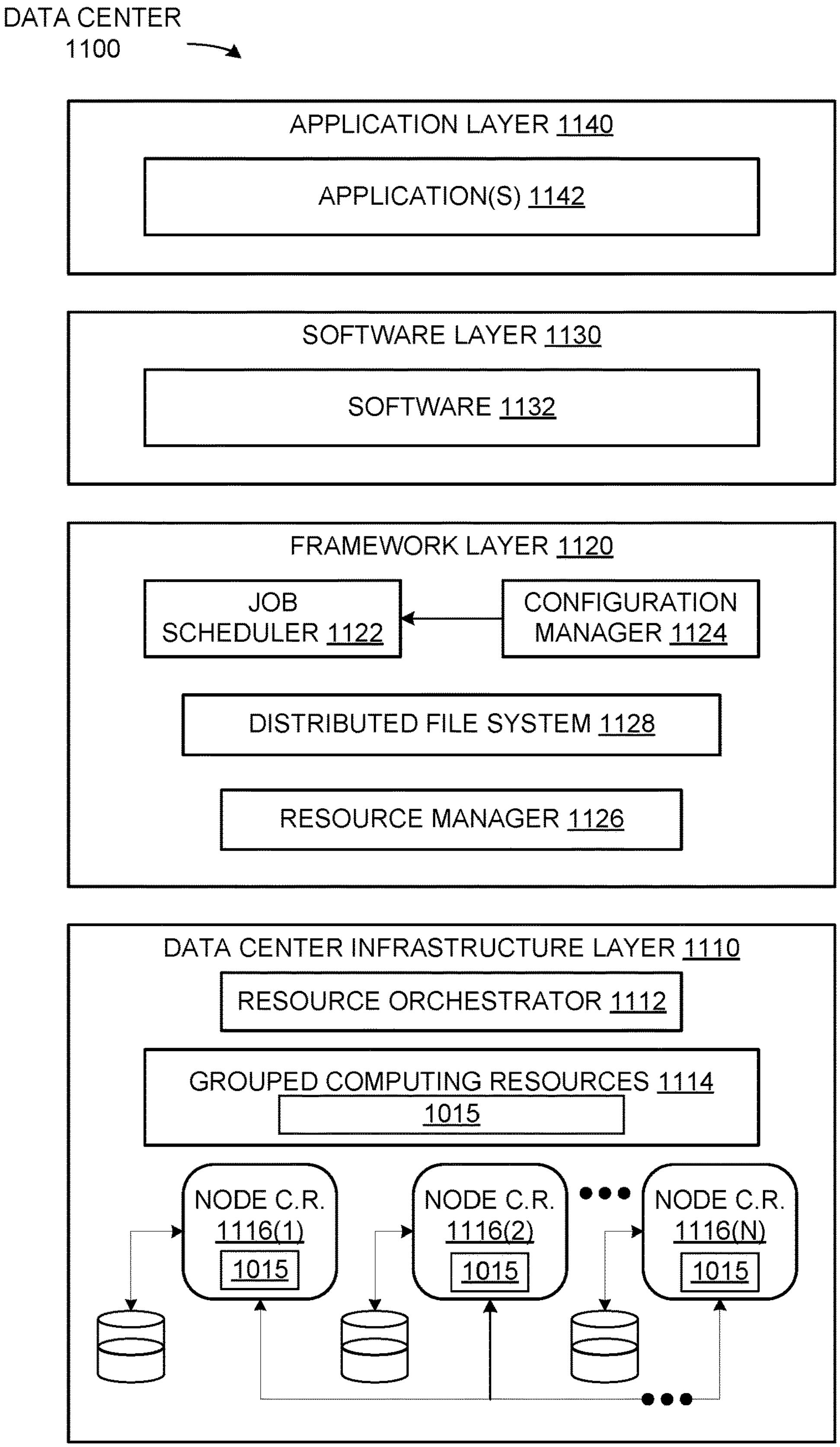
FIG. 11 illustrates an example data center system, according to at least one embodiment.

FIG. 11 illustrates an example data center 1100, in which at least one embodiment may be used. In at least one embodiment, data center 1100 includes a data center infrastructure layer 1110, a framework layer 1120, a software layer 1130, and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator 1112 may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may use distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resources 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. The one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116 (N), grouped computing resources 1114, and/or distributed file system 1128 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underused and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1115 are used to perform inferencing and/or training operations associated with one or more embodiments. In at least one embodiment, inference and/or training logic 1015 may be used in FIG. 11 for inferencing or predicting operations based, at least in part, on weight parameters calculated using neural network training operations, neural network functions and/or architectures, or neural network use cases described herein.

Such components can be used to replace an object in an image using a generative diffusion model conditioned on depth information.

Computer Systems

Figure 12:
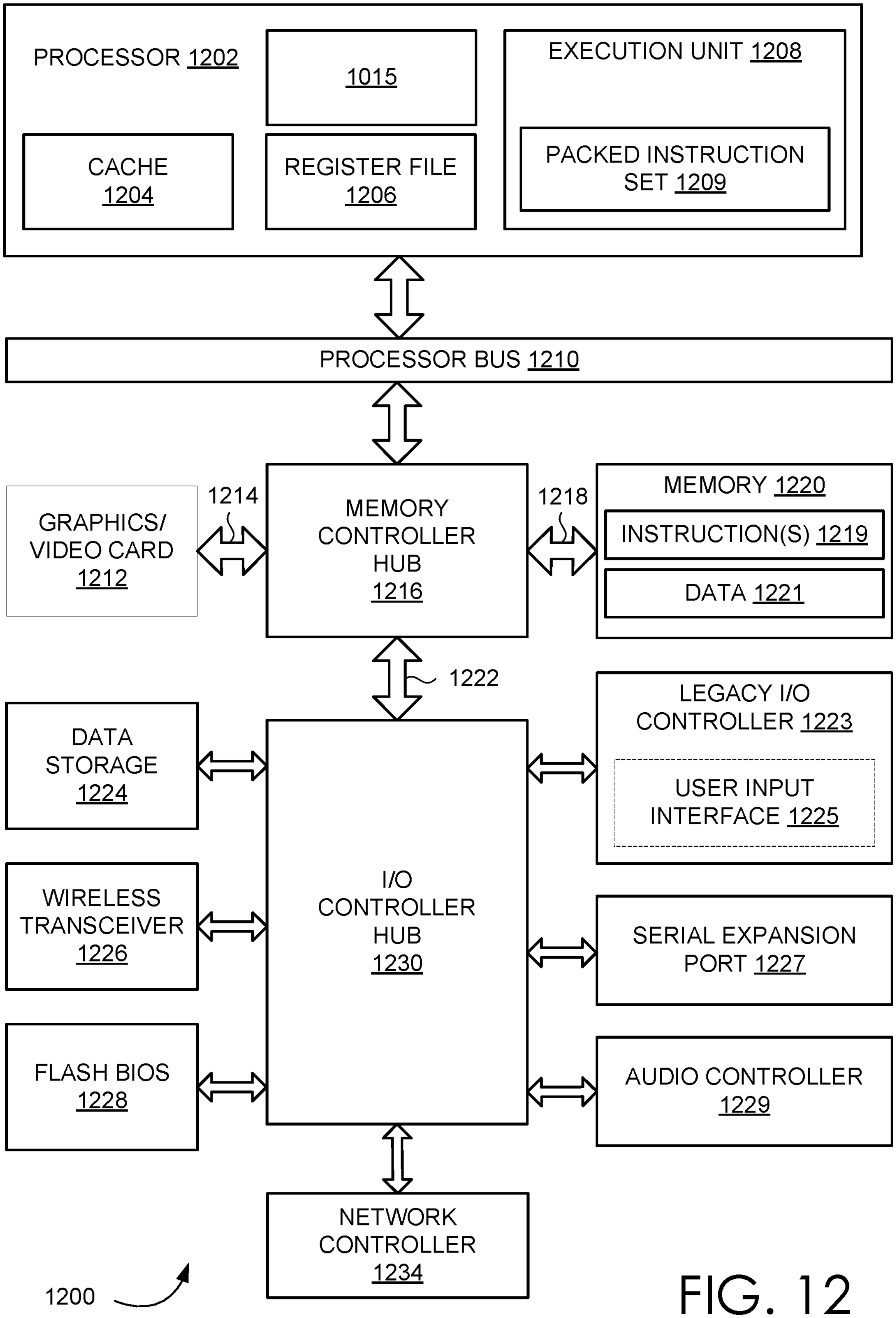
FIG. 12 illustrates a computer system, according to at least one embodiment.

FIG. 12 is a block diagram illustrating an exemplary computer system 1200, which may be a system with interconnected devices and components, a system-on-a-chip (SOC) or some combination thereof formed with a processor that may include execution units to execute an instruction, according to at least one embodiment. In at least one embodiment, computer system 1200 may include, without limitation, a component, such as a processor 1202 to employ execution units including logic to perform algorithms for process data, in accordance with present disclosure, such as in embodiment described herein. In at least one embodiment, computer system 1200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1200 may include, without limitation, processor 1202 that may include, without limitation, one or more execution unit(s) 1208 to perform machine learning model training and/or inferencing according to techniques described herein. In at least one embodiment, computer system 1200 is a single processor desktop or server system, but in another embodiment computer system 1200 may be a multiprocessor system. In at least one embodiment, processor 1202 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache 1204 may reside external to processor 1202. Other embodiments may also include a combination of both internal and external caches depending on particular implementation and needs. In at least one embodiment, register file 1206 may store different types of data in various registers including, without limitation, integer registers, floating point registers, status registers, and instruction pointer register.

In at least one embodiment, execution unit(s) 1208, including, without limitation, logic to perform integer and floating point operations, also resides in processor 1202. In at least one embodiment, processor 1202 may also include a microcode ("ucode") read only memory ("ROM") that stores microcode for certain macro instructions. In at least one embodiment, execution unit(s) 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In one or more embodiments, many multimedia applications may be accelerated and executed more efficiently by using full width of a processor data bus 1210 for performing operations on packed data, which may eliminate need to transfer smaller units of data across processor data bus 1210 to perform one or more operations one data element at a time.

In at least one embodiment, execution unit(s) 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a Dynamic Random Access Memory ("DRAM") device, a Static Random Access Memory ("SRAM") device, flash memory device, or other memory device. In at least one embodiment, memory 1220 may store instruction(s) 1219 and/or data 1221 represented by data signals that may be executed by processor 1202.

In at least one embodiment, system logic chip may be coupled to processor bus 1210 and memory 1220. In at least one embodiment, system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through a high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, chipset, and processor 1202. Examples may include, without limitation, an audio controller 1229, a firmware hub ("flash BIOS") 1228, a wireless transceiver 1226, a data storage 1224, a legacy I/O controller 1223 containing user input and keyboard interface(s) 1225, a serial expansion port 1227, such as Universal Serial Bus ("USB"), and a network controller 1234. Data storage 1224 may comprise a hard disk drive, a floppy disk drive, a CD-ROM device, a flash memory device, or other mass storage device.

In at least one embodiment, FIG. 12 illustrates a system, which includes interconnected hardware devices or "chips", whereas in other embodiments, FIG. 12 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1200 are interconnected using compute express link (CXL) interconnects.

Inference and/or training logic 1015 are used to perform inferencing and/or training operations associated with one or more embodiments. In at least one embodiment, inference and/or training logic 1015 may be used in system FIG. 12 for inferencing or predicting operations based, at least in part, on weight parameters calculated using neural network training operations, neural network functions and/or architectures, or neural network use cases described herein.

Such components can be used to replace an object in an image using a generative diffusion model conditioned on depth information.

Figure 13:
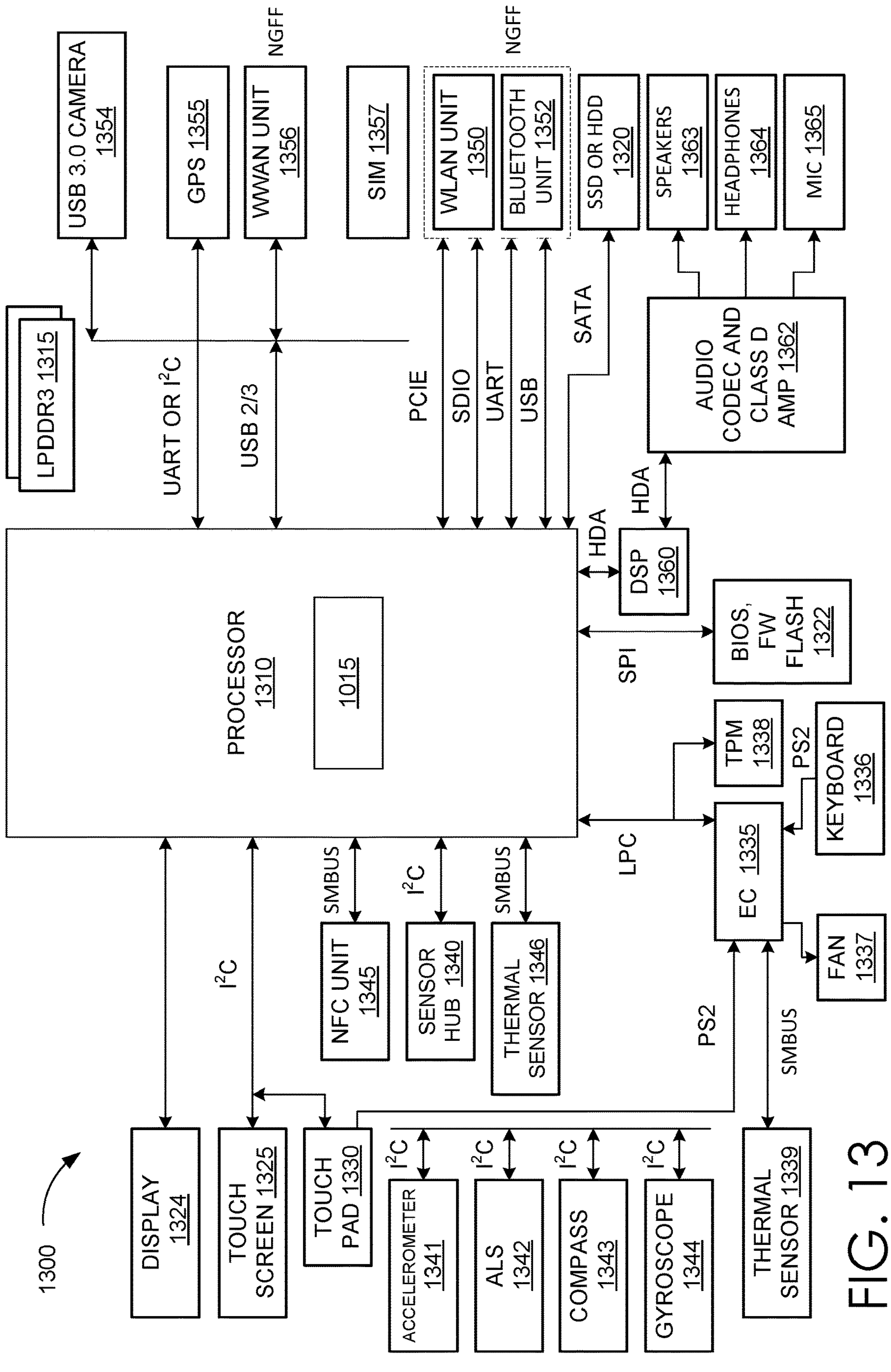
FIG. 13 illustrates a computer system, according to at least one embodiment.

FIG. 13 is a block diagram illustrating an electronic device 1300 for using a processor 1310, according to at least one embodiment. In at least one embodiment, electronic device 1300 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1300 may include, without limitation, processor 1310 communicatively coupled to any suitable number or kind of components, peripherals, modules, or devices. In at least one embodiment, processor 1310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 13 illustrates an electronic device 1300, which includes interconnected hardware devices or "chips", whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using compute express link (CXL) interconnects.

In at least one embodiment, FIG. 13 may include a display 1324, a touch screen 1325, a touch pad 1330, a Near Field Communications unit ("NFC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a drive 1320 such as a Solid State Disk ("SSD") or a Hard Disk Drive ("HDD"), a wireless local area network unit ("WLAN") 1350, a Bluetooth unit 1352, a Wireless Wide Area Network unit ("WWAN") 1356, a Global Positioning System (GPS) 1355, a camera ("USB 3.0 camera") 1354 such as a USB 3.0 camera, and/or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, Ambient Light Sensor ("ALS") 1342, compass 1343, and a gyroscope 1344 may be communicatively coupled to sensor hub 1340. In at least one embodiment, thermal sensor 1339, a fan 1337, a keyboard 1336, and a touch pad 1330 may be communicatively coupled to EC 1335. In at least one embodiment, speakers 1363, headphones 1364, and microphone ("mic") 1365 may be communicatively coupled to an audio unit ("audio codec and class d amp") 1362, which may in turn be communicatively coupled to DSP 1360. In at least one embodiment, audio unit 1362 may include, for example and without limitation, an audio coder/decoder ("codec") and a class D amplifier. In at least one embodiment, SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Inference and/or training logic 1015 are used to perform inferencing and/or training operations associated with one or more embodiments. In at least one embodiment, inference and/or training logic 1015 may be used in system FIG. 13 for inferencing or predicting operations based, at least in part, on weight parameters calculated using neural network training operations, neural network functions and/or architectures, or neural network use cases described herein.

Such components can be used to replace an object in an image using a generative diffusion model conditioned on depth information.

Figure 14:
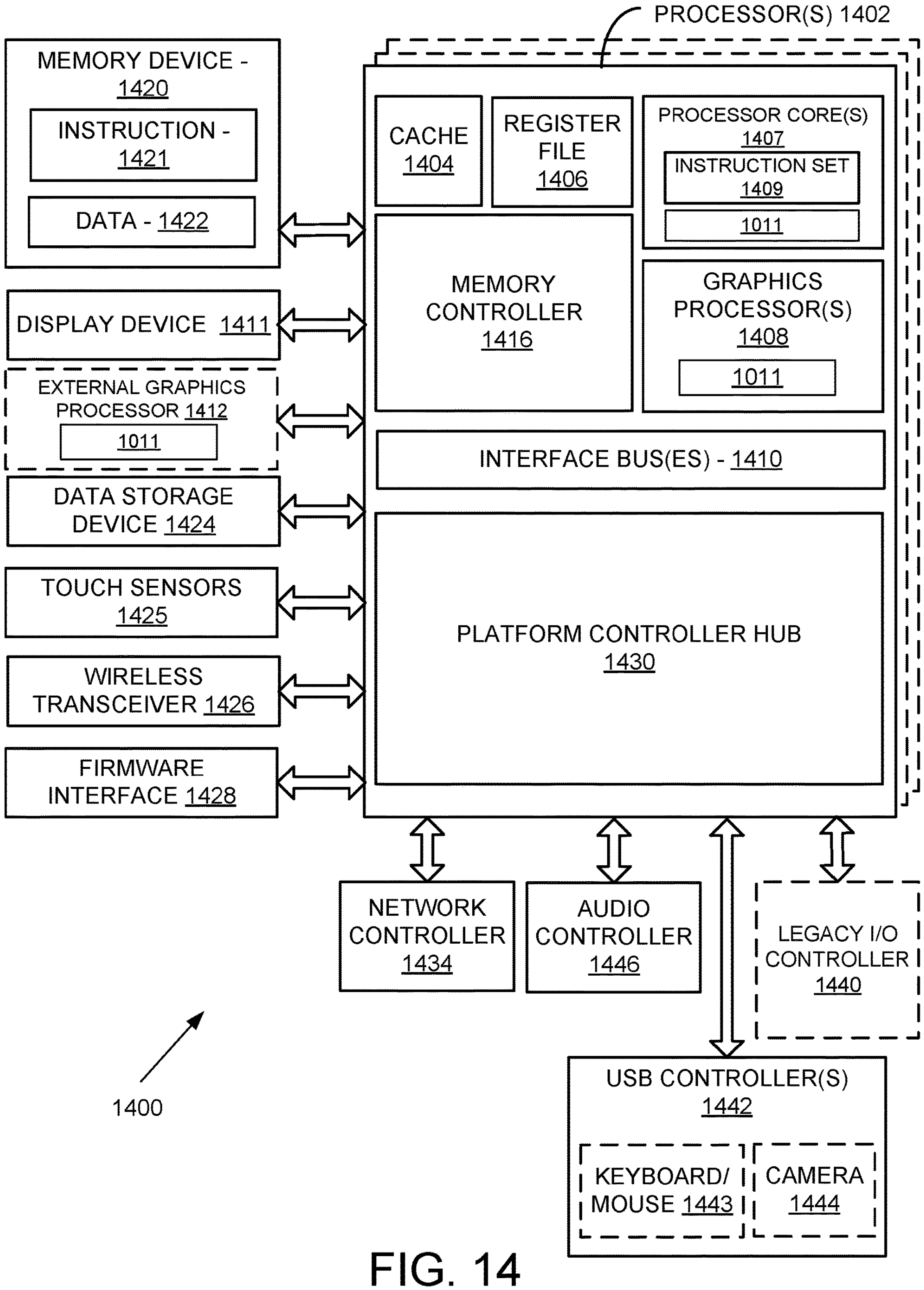
FIG. 14 illustrates at least portions of a graphics processor, according to one or more embodiments.

FIG. 14 is a block diagram of a processing system, according to at least one embodiment. In at least one embodiment, system 1400 includes one or more processor(s) 1402 and one or more graphics processor(s) 1408, and may be a single processor desktop system, a multiprocessor workstation system, or a server system having a large number of processor(s) 1402 or processor cores 1407. In at least one embodiment, system 1400 is a processing platform incorporated within a system-on-a-chip (SoC) integrated circuit for use in mobile, handheld, or embedded devices.

In at least one embodiment, system 1400 can include, or be incorporated within a server-based gaming platform, a game console, including a game and media console, a mobile gaming console, a handheld game console, or an online game console. In at least one embodiment, system 1400 is a mobile phone, smart phone, tablet computing device or mobile Internet device. In at least one embodiment, processing system 1400 can also include, coupled with, or be integrated within a wearable device, such as a smart watch wearable device, smart eyewear device, augmented reality device, or virtual reality device. In at least one embodiment, processing system 1400 is a television or set top box device having one or more processor(s) 1402 and a graphical interface generated by one or more graphics processor(s) 1408.

In at least one embodiment, one or more processor(s) 1402 each include one or more processor cores 1407 to process instructions which, when executed, perform operations for system and user software. In at least one embodiment, each of one or more processor cores 1407 is configured to process a specific instruction set 1409. In at least one embodiment, instruction set 1409 may facilitate Complex Instruction Set Computing (CISC), Reduced Instruction Set Computing (RISC), or computing via a Very Long Instruction Word (VLIW). In at least one embodiment, processor cores 1407 may each process a different instruction set 1409, which may include instructions to facilitate emulation of other instruction sets. In at least one embodiment, processor core 1407 may also include other processing devices, such a Digital Signal Processor (DSP).

In at least one embodiment, processor(s) 1402 includes cache memory ("cache") 1404. In at least one embodiment, processor(s) 1402 can have a single internal cache or multiple levels of internal cache. In at least one embodiment, cache 1404 is shared among various components of processor(s) 1402. In at least one embodiment, processor(s) 1402 also uses an external cache (e.g., a Level-3 (L3) cache or Last Level Cache (LLC)) (not shown), which may be shared among processor cores 1407 using known cache coherency techniques. In at least one embodiment, register file 1406 is additionally included in processor(s) 1402 which may include different types of registers for storing different types of data (e.g., integer registers, floating point registers, status registers, and an instruction pointer register). In at least one embodiment, register file 1406 may include general-purpose registers or other registers.

In at least one embodiment, one or more processor(s) 1402 are coupled with one or more interface bus(es) 1410 to transmit communication signals such as address, data, or control signals between processor(s) 1402 and other components in system 1400. In at least one embodiment, interface bus(es) 1410, in one embodiment, can be a processor bus, such as a version of a Direct Media Interface (DMI) bus. In at least one embodiment, interface bus(es) 1410 is not limited to a DMI bus, and may include one or more Peripheral Component Interconnect buses (e.g., PCI, PCI Express), memory busses, or other types of interface busses. In at least one embodiment processor(s) 1402 include an integrated memory controller 1416 and a platform controller hub 1430. In at least one embodiment, memory controller 1416 facilitates communication between a memory device and other components of system 1400, while platform controller hub 1430 provides connections to I/O devices via a local I/O bus.

In at least one embodiment, memory device 1420 can be a dynamic random access memory (DRAM) device, a static random access memory (SRAM) device, flash memory device, phase-change memory device, or some other memory device having suitable performance to serve as process memory. In at least one embodiment memory device 1420 can operate as system memory for system 1400, to store data 1422 and instructions 1421 for use when one or more processor(s) 1402 executes an application or process. In at least one embodiment, memory controller 1416 also couples with an optional external graphics processor 1412, which may communicate with one or more graphics processor(s) 1408 in processor(s) 1402 to perform graphics and media operations. In at least one embodiment, a display device 1411 can connect to processor(s) 1402. In at least one embodiment display device 1411 can include one or more of an internal display device, as in a mobile electronic device or a laptop device or an external display device attached via a display interface (e.g., DisplayPort, etc.). In at least one embodiment, display device 1411 can include a head mounted display (HMD) such as a stereoscopic display device for use in virtual reality (VR) applications or augmented reality (AR) applications.

In at least one embodiment, platform controller hub 1430 allows peripherals to connect to memory device 1420 and processor(s) 1402 via a high-speed I/O bus. In at least one embodiment, I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). In at least one embodiment, data storage device 1424 can connect via a storage interface (e.g., SATA) or via a peripheral bus, such as a Peripheral Component Interconnect bus (e.g., PCI, PCI Express). In at least one embodiment, touch sensors 1425 can include touch screen sensors, pressure sensors, or fingerprint sensors. In at least one embodiment, wireless transceiver 1426 can be a Wi-Fi transceiver, a Bluetooth transceiver, or a mobile network transceiver such as a 3G, 4G, or Long Term Evolution (LTE) transceiver. In at least one embodiment, firmware interface 1428 allows communication with system firmware, and can be, for example, a unified extensible firmware interface (UEFI). In at least one embodiment, network controller 1434 can allow a network connection to a wired network. In at least one embodiment, a high-performance network controller (not shown) couples with interface bus(es) 1410. In at least one embodiment, audio controller 1446 is a multi-channel high definition audio controller. In at least one embodiment, system 1400 includes an optional legacy I/O controller 1440 for coupling legacy (e.g., Personal System 2 (PS/2)) devices to system. In at least one embodiment, platform controller hub 1430 can also connect to one or more Universal Serial Bus (USB) controllers 1442 connect input devices, such as keyboard and mouse 1443 combinations, a camera 1444, or other USB input devices.

In at least one embodiment, an instance of memory controller 1416 and platform controller hub 1430 may be integrated into a discreet external graphics processor, such as external graphics processor 1412. In at least one embodiment, platform controller hub 1430 and/or memory controller 1416 may be external to one or more processor(s) 1402. For example, in at least one embodiment, system 1400 can include an external memory controller 1416 and platform controller hub 1430, which may be configured as a memory controller hub and peripheral controller hub within a system chipset that is in communication with processor(s) 1402.

Inference and/or training logic 1015 are used to perform inferencing and/or training operations associated with one or more embodiments. In at least one embodiment portions or all of inference and/or training logic 1015 may be incorporated into system 1400. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 10A and/or 10B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to replace an object in an image using a generative diffusion model conditioned on depth information.

Figure 15:
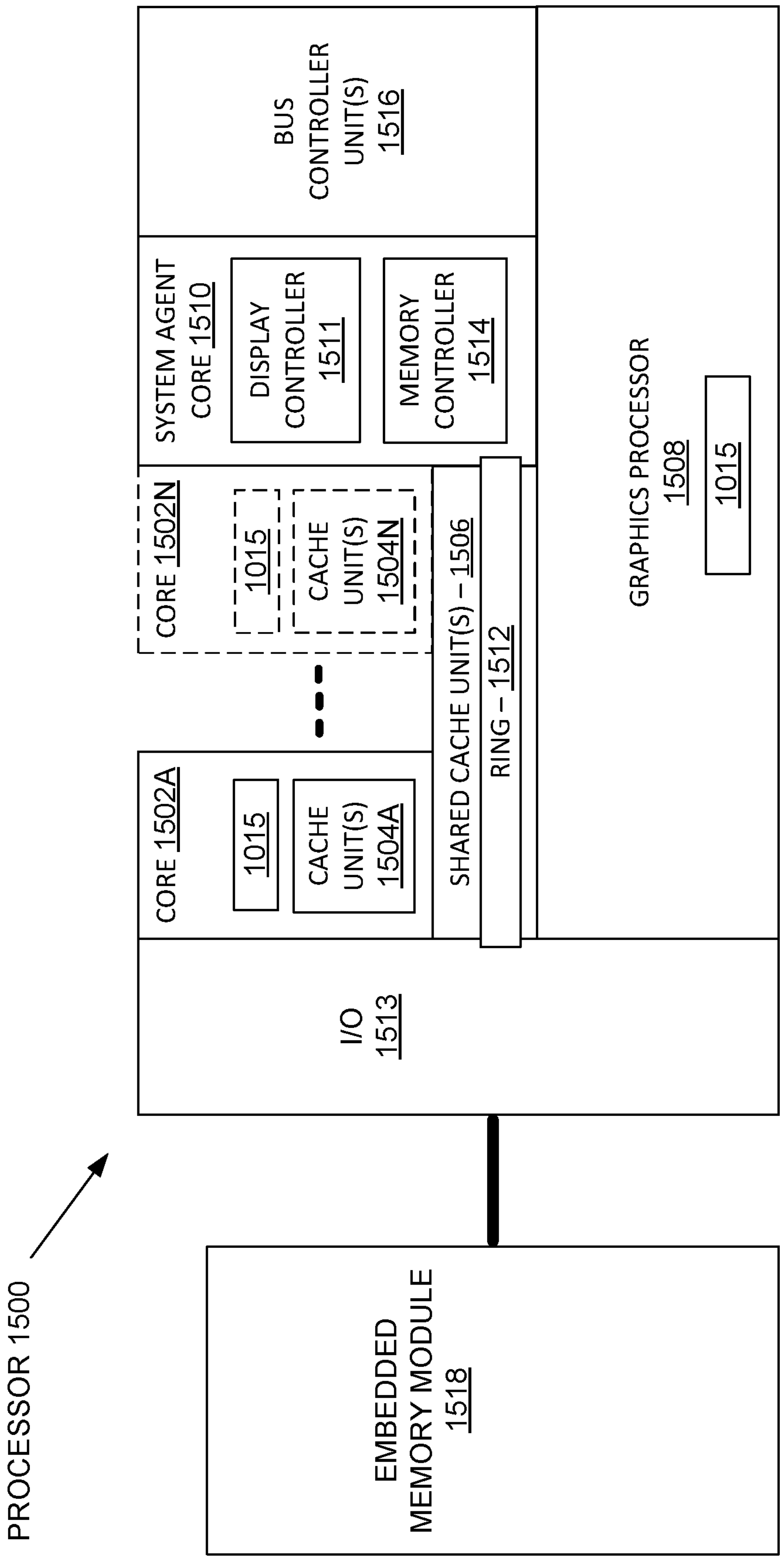
FIG. 15 illustrates at least portions of a graphics processor, according to one or more embodiments.

FIG. 15 is a block diagram of a processor 1500 having one or more processor core(s) 1502A-1502N, an integrated memory controller 1514, and an integrated graphics processor 1508, according to at least one embodiment. In at least one embodiment, processor 1500 can include additional cores up to and including additional core 1502N represented by dashed lined boxes. In at least one embodiment, each of processor core(s) 1502A-1502N includes one or more internal cache unit(s) 1504A-1504N. In at least one embodiment, each processor core also has access to one or more shared cached unit(s) 1506.

In at least one embodiment, internal cache unit(s) 1504A-1504N and shared cache units 1506 represent a cache memory hierarchy within processor 1500. In at least one embodiment, cache unit(s) 1504A-1504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1506 and 1504A-1504N.

In at least one embodiment, processor 1500 may also include a set of one or more bus controller unit(s) 1516 and a system agent core 1510. In at least one embodiment, one or more bus controller unit(s) 1516 manage a set of peripheral buses, such as one or more PCI or PCI express buses. In at least one embodiment, system agent core 1510 provides management functionality for various processor components. In at least one embodiment, system agent core 1510 includes one or more integrated memory controllers 1514 to manage access to various external memory devices (not shown).

In at least one embodiment, one or more of processor core(s) 1502A-1502N include support for simultaneous multi-threading. In at least one embodiment, system agent core 1510 includes components for coordinating and processor core(s) 1502A-1502N during multi-threaded processing. In at least one embodiment, system agent core 1510 may additionally include a power control unit (PCU), which includes logic and components to regulate one or more power states of processor core(s) 1502A-1502N and graphics processor 1508.

In at least one embodiment, processor 1500 additionally includes graphics processor 1508 to execute graphics processing operations. In at least one embodiment, graphics processor 1508 couples with shared cache units 1506, and system agent core 1510, including one or more integrated memory controllers 1514. In at least one embodiment, system agent core 1510 also includes a display controller 1511 to drive graphics processor output to one or more coupled displays. In at least one embodiment, display controller 1511 may also be a separate module coupled with graphics processor 1508 via at least one interconnect, or may be integrated within graphics processor 1508.

In at least one embodiment, a ring based interconnect unit 1512 is used to couple internal components of processor 1500. In at least one embodiment, an alternative interconnect unit may be used, such as a point-to-point interconnect, a switched interconnect, or other techniques. In at least one embodiment, graphics processor 1508 couples with ring based interconnect unit 1512 via an I/O link 1513.

In at least one embodiment, I/O link 1513 represents at least one of multiple varieties of I/O interconnects, including an on package I/O interconnect which facilitates communication between various processor components and a high-performance embedded memory module 1518, such as an eDRAM module. In at least one embodiment, each of processor core(s) 1502A-1502N and graphics processor 1508 use embedded memory module 1518 as a shared Last Level Cache.

In at least one embodiment, processor core(s) 1502A-1502N are homogenous cores executing a common instruction set architecture. In at least one embodiment, processor core(s) 1502A-1502N are heterogeneous in terms of instruction set architecture (ISA), where one or more of processor core(s) 1502A-1502N execute a common instruction set, while one or more other cores of processor core(s) 1502A-1502N executes a subset of a common instruction set or a different instruction set. In at least one embodiment, processor core(s) 1502A-1502N are heterogeneous in terms of microarchitecture, where one or more cores having a relatively higher power consumption couple with one or more power cores having a lower power consumption. In at least one embodiment, processor 1500 can be implemented on one or more chips or as an SoC integrated circuit.

Inference and/or training logic 1015 are used to perform inferencing and/or training operations associated with one or more embodiments. In at least one embodiment portions or all of inference and/or training logic 1015 may be incorporated into processor 1500. For example, in at least one embodiment, training and/or inferencing techniques described herein may use one or more of ALUs embodied in graphics processor 1508, graphics core(s) 1502A-1502N, or other components in FIG. 15. Moreover, in at least one embodiment, inferencing and/or training operations described herein may be done using logic other than logic illustrated in FIGS. 10A and/or 10B. In at least one embodiment, weight parameters may be stored in on-chip or off-chip memory and/or registers (shown or not shown) that configure ALUs of graphics processor 1500 to perform one or more machine learning algorithms, neural network architectures, use cases, or training techniques described herein.

Such components can be used to replace an object in an image using a generative diffusion model conditioned on depth information.

Virtualized Computing Platform

Figure 16:
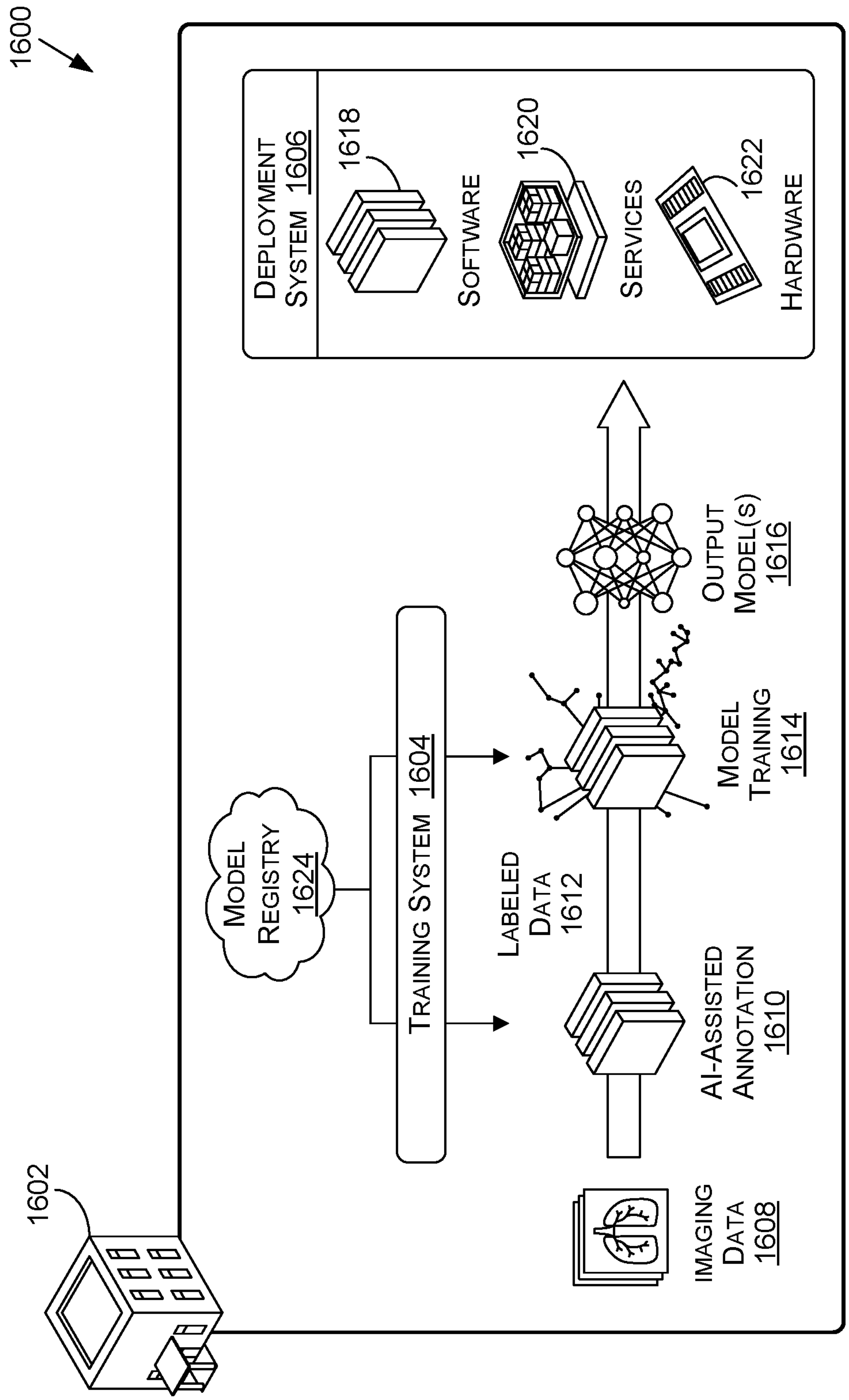
FIG. 16 is an example data flow diagram for an advanced computing pipeline, in accordance with at least one embodiment.

FIG. 16 is an example data flow diagram for a process 1600 of generating and deploying an image processing and inferencing pipeline, in accordance with at least one embodiment. In at least one embodiment, process 1600 may be deployed for use with imaging devices, processing devices, and/or other device types at one or more facility(ies) 1602. Process 1600 may be executed within a training system 1604 and/or a deployment system 1606. In at least one embodiment, training system 1604 may be used to perform training, deployment, and implementation of machine learning models (e.g., neural networks, object detection algorithms, computer vision algorithms, etc.) for use in deployment system 1606. In at least one embodiment, deployment system 1606 may be configured to offload processing and compute resources among a distributed computing environment to reduce infrastructure requirements at facility(ies) 1602. In at least one embodiment, one or more applications in a pipeline may use or call upon services (e.g., inference, visualization, compute, AI, etc.) of deployment system 1606 during execution of applications.

In at least one embodiment, some of applications used in advanced processing and inferencing pipelines may use machine learning models or other AI to perform one or more processing steps. In at least one embodiment, machine learning models may be trained at facility(ies) 1602 using data 1608 (such as imaging data) generated at facility(ies) 1602 (and stored on one or more picture archiving and communication system (PACS) servers at facility(ies) 1602), may be trained using imaging or sequencing data 1608 from another facility(ies), or a combination thereof. In at least one embodiment, training system 1604 may be used to provide applications, services, and/or other resources for generating working, deployable machine learning models for deployment system 1606.

In at least one embodiment, model registry 1624 may be backed by object storage that may support versioning and object metadata. In at least one embodiment, object storage may be accessible through, for example, a cloud storage compatible application programming interface (API) from within a cloud platform. In at least one embodiment, machine learning models within model registry 1624 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1604 (FIG. 16) may include a scenario where facility(ies) 1602 is training their own machine learning model, or has an existing machine learning model that needs to be optimized or updated. In at least one embodiment, imaging data 1608 generated by imaging device(s), sequencing devices, and/or other device types may be received. In at least one embodiment, once imaging data 1608 is received, AI-assisted annotation 1610 may be used to aid in generating annotations corresponding to imaging data 1608 to be used as ground truth data for a machine learning model. In at least one embodiment, AI-assisted annotation 1610 may include one or more machine learning models (e.g., convolutional neural networks (CNNs)) that may be trained to generate annotations corresponding to certain types of imaging data 1608 (e.g., from certain devices). In at least one embodiment, AI-assisted annotations 1610 may then be used directly, or may be adjusted or fine-tuned using an annotation tool to generate ground truth data. In at least one embodiment, AI-assisted annotations 1610, labeled data 1612, or a combination thereof may be used as ground truth data for training a machine learning model. In at least one embodiment, a trained machine learning model may be referred to as output model(s) 1616, and may be used by deployment system 1606, as described herein.

In at least one embodiment, a training pipeline may include a scenario where facility(ies) 1602 needs a machine learning model for use in performing one or more processing tasks for one or more applications in deployment system 1606, but facility(ies) 1602 may not currently have such a machine learning model (or may not have a model that is optimized, efficient, or effective for such purposes). In at least one embodiment, an existing machine learning model may be selected from a model registry 1624. In at least one embodiment, model registry 1624 may include machine learning models trained to perform a variety of different inference tasks on imaging data. In at least one embodiment, machine learning models in model registry 1624 may have been trained on imaging data from different facilities than facility(ies) 1602 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1624. In at least one embodiment, a machine learning model may then be retrained, or updated, at any number of other facilities, and a retrained or updated model may be made available in model registry 1624. In at least one embodiment, a machine learning model may then be selected from model registry 1624—and referred to as output models) 1616—and may be used in deployment system 1606 to perform one or more processing tasks for one or more applications of a deployment system.

In at least one embodiment, a scenario may include facility(ies) 1602 requiring a machine learning model for use in performing one or more processing tasks for one or more applications in deployment system 1606, but facility(ies) 1602 may not currently have such a machine learning model (or may not have a model that is optimized, efficient, or effective for such purposes). In at least one embodiment, a machine learning model selected from model registry 1624 may not be fine-tuned or optimized for imaging data 1608 generated at facility(ies) 1602 because of differences in populations, robustness of training data used to train a machine learning model, diversity in anomalies of training data, and/or other issues with training data. In at least one embodiment, AI-assisted annotation 1610 may be used to aid in generating annotations corresponding to imaging data 1608 to be used as ground truth data for retraining or updating a machine learning model. In at least one embodiment, labeled data 1612 may be used as ground truth data for training a machine learning model. In at least one embodiment, retraining or updating a machine learning model may be referred to as model training 1614. In at least one embodiment, model training 1614—e.g., AI-assisted annotations 1610, labeled data 1612, or a combination thereof—may be used as ground truth data for retraining or updating a machine learning model. In at least one embodiment, a trained machine learning model may be referred to as output model(s) 1616, and may be used by deployment system 1606, as described herein.

In at least one embodiment, deployment system 1606 may include software 1618, services 1620, hardware 1622, and/or other components, features, and functionality. In at least one embodiment, deployment system 1606 may include a software "stack," such that software 1618 may be built on top of services 1620 and may use services 1620 to perform some or all of processing tasks, and services 1620 and software 1618 may be built on top of hardware 1622 and use hardware 1622 to execute processing, storage, and/or other compute tasks of deployment system 1606. In at least one embodiment, software 1618 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1608, in addition to containers that receive and configure imaging data for use by each container and/or for use by facility(ies) 1602 after processing through a pipeline (e.g., to convert outputs back to a usable data type). In at least one embodiment, a combination of containers within software 1618 (e.g., that make up a pipeline) may be referred to as a virtual instrument (as described in more detail herein), and a virtual instrument may leverage services 1620 and hardware 1622 to execute some or all processing tasks of applications instantiated in containers.

In at least one embodiment, a data processing pipeline may receive input data (e.g., imaging data 1608) in a specific format in response to an inference request (e.g., a request from a user of deployment system 1606). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1616 of training system 1604.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1624 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1620 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1600 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1600 of FIG. 16). In at least one embodiment, completed and validated applications or containers may be stored in a container registry and associated machine learning models may be stored in model registry 1624. In at least one embodiment, a requesting entity-who provides an inference or image processing request—may browse a container registry and/or model registry 1624 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1606 (e.g., a cloud) to perform processing of data processing pipeline. In at least one embodiment, processing by deployment system 1606 may include referencing selected elements (e.g., applications, containers, models, etc.) from a container registry and/or model registry 1624. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1620 may be leveraged. In at least one embodiment, services 1620 may include compute services, artificial intelligence (AI) services, visualization services, and/or other service types. In at least one embodiment, services 1620 may provide functionality that is common to one or more applications in software 1618, so functionality may be abstracted to a service that may be called upon or leveraged by applications. In at least one embodiment, functionality provided by services 1620 may run dynamically and more efficiently, while also scaling well by allowing applications to process data in parallel (e.g., using a parallel computing platform). In at least one embodiment, rather than each application that shares a same functionality offered by services 1620 being required to have a respective instance of services 1620, services 1620 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1620 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1618 implementing advanced processing and inferencing pipeline that includes segmentation application and anomaly detection application may be streamlined because each application may call upon a same inference service to perform one or more inferencing tasks.

In at least one embodiment, hardware 1622 may include GPUs, CPUs, graphics cards, an AI/deep learning system (e.g., an AI supercomputer, such as NVIDIA's DGX), a cloud platform, or a combination thereof. In at least one embodiment, different types of hardware 1622 may be used to provide efficient, purpose-built support for software 1618 and services 1620 in deployment system 1606. In at least one embodiment, use of GPU processing may be implemented for processing locally (e.g., at facility(ies) 1602), within an AI/deep learning system, in a cloud system, and/or in other processing components of deployment system 1606 to improve efficiency, accuracy, and efficacy of image processing and generation. In at least one embodiment, software 1618 and/or services 1620 may be optimized for GPU processing with respect to deep learning, machine learning, and/or high-performance computing, as non-limiting examples. In at least one embodiment, at least some of computing environment of deployment system 1606 and/or training system 1604 may be executed in a datacenter one or more supercomputers or high performance computing systems, with GPU optimized software (e.g., hardware and software combination of NVIDIA's DGX System). In at least one embodiment, hardware 1622 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allow seamless scaling and load balancing.

Figure 17:
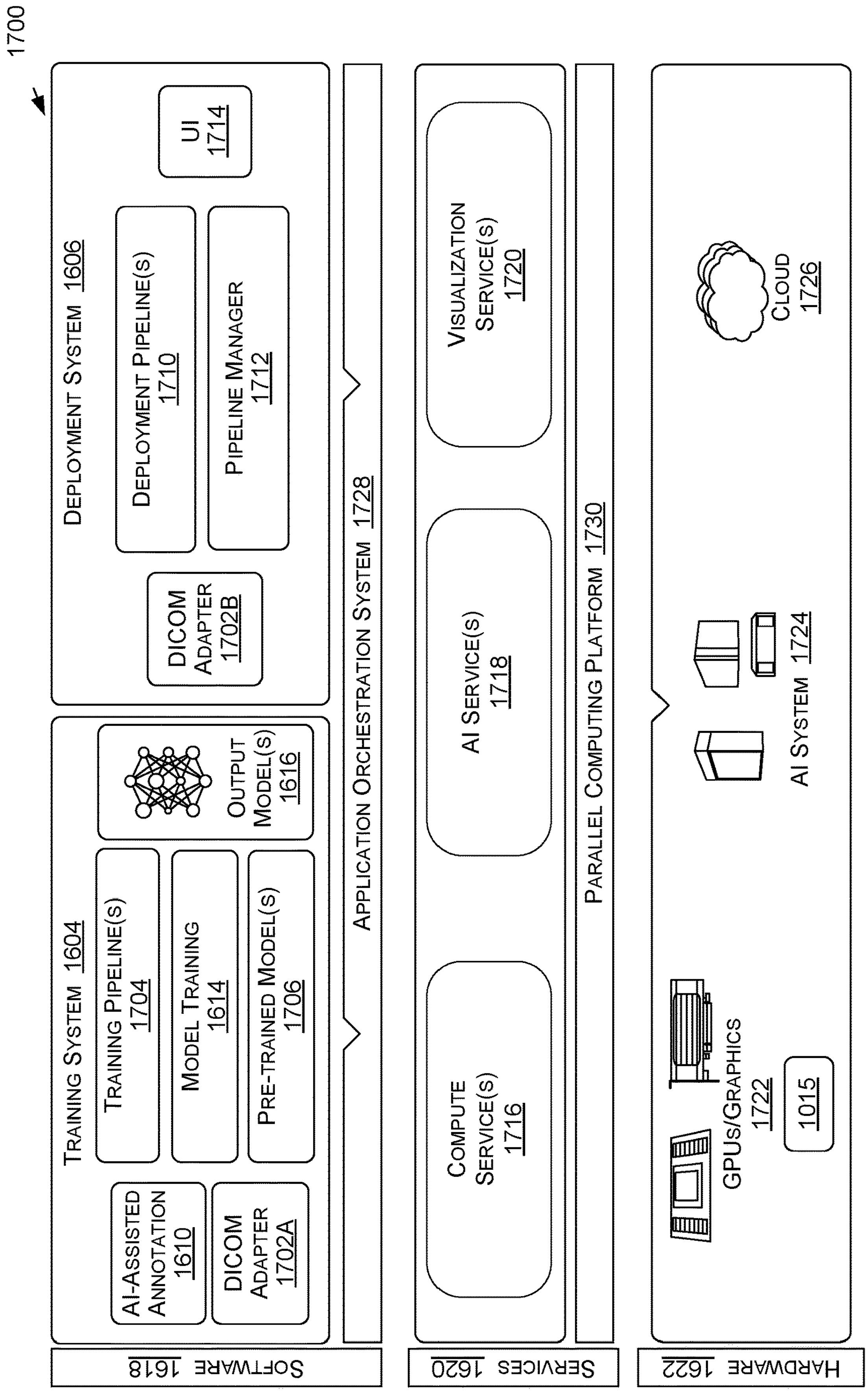
FIG. 17 is a system diagram for an example system for training, adapting, instantiating and deploying machine learning models in an advanced computing pipeline, in accordance with at least one embodiment.

FIG. 17 is a system diagram for an example system 1700 for generating and deploying an imaging deployment pipeline, in accordance with at least one embodiment. In at least one embodiment, system 1700 may be used to implement processor 1400 of FIG. 14 and/or other processes including advanced processing and inferencing pipelines. In at least one embodiment, system 1700 may include training system 1604 and deployment system 1606. In at least one embodiment, training system 1604 and deployment system 1606 may be implemented using software 1618, services 1620, and/or hardware 1622, as described herein.

In at least one embodiment, system 1700 (e.g., training system 1604 and/or deployment system 1606) may be implemented in a cloud computing environment (e.g., using cloud 1726). In at least one embodiment, system 1700 may be implemented locally with respect to a healthcare services facility, or as a combination of both cloud and local computing resources. In at least one embodiment, access to APIs in cloud 1726 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1700, may be restricted to a set of public IPs that have been vetted or authorized for interaction.

In at least one embodiment, various components of system 1700 may communicate between and among one another using any of a variety of different network types, including but not limited to local area networks (LANs) and/or wide area networks (WANs) via wired and/or wireless communication protocols. In at least one embodiment, communication between facilities and components of system 1700 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1604 may execute training pipeline(s) 1704, similar to those described herein with respect to FIG. 16. In at least one embodiment, where one or more machine learning models are to be used in deployment pipeline(s) 1710 by deployment system 1606, training pipeline(s) 1704 may be used to train or retrain one or more (e.g., pre-trained) models, and/or implement one or more of pre-trained model(s) 1706 (e.g., without a need for retraining or updating). In at least one embodiment, as a result of training pipeline(s) 1704, output model(s) 1616 may be generated. In at least one embodiment, training pipeline(s) 1704 may include any number of processing steps, such as but not limited to imaging data (or other input data) conversion or adaption In at least one embodiment, for different machine learning models used by deployment system 1606, different training pipeline(s) 1704 may be used. In at least one embodiment, training pipeline(s) 1704 similar to a first example described with respect to FIG. 16 may be used for a first machine learning model, training pipeline(s) 1704 similar to a second example described with respect to FIG. 16 may be used for a second machine learning model, and training pipeline(s) 1704 similar to a third example described with respect to FIG. 16 may be used for a third machine learning model. In at least one embodiment, any combination of tasks within training system 1604 may be used depending on what is required for each respective machine learning model. In at least one embodiment, one or more of machine learning models may already be trained and ready for deployment so machine learning models may not undergo any processing by training system 1604, and may be implemented by deployment system 1606.

In at least one embodiment, output model(s) 1616 and/or pre-trained model(s) 1706 may include any types of machine learning models depending on implementation or embodiment. In at least one embodiment, and without limitation, machine learning models used by system 1700 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipeline(s) 1704 may include AI-assisted annotation, as described in more detail herein with respect to at least FIG. 17. In at least one embodiment, labeled data 1612 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1608 (or other data type used by machine learning models), there may be corresponding ground truth data generated by training system 1604. In at least one embodiment, AI-assisted annotation may be performed as part of deployment pipeline(s) 1710; either in addition to, or in lieu of AI-assisted annotation included in training pipeline(s) 1704. In at least one embodiment, system 1700 may include a multi-layer platform that may include a software layer (e.g., software 1618) of diagnostic applications (or other application types) that may perform one or more medical imaging and diagnostic functions. In at least one embodiment, system 1700 may be communicatively coupled to (e.g., via encrypted links) PACS server networks of one or more facilities. In at least one embodiment, system 1700 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility(ies) 1602). In at least one embodiment, applications may then call or execute one or more services 1620 for performing compute, AI, or visualization tasks associated with respective applications, and software 1618 and/or services 1620 may leverage hardware 1622 to perform processing tasks in an effective and efficient manner. In at least one embodiment, communications sent to, or received by, a training system 1604 and a deployment system 1606 may occur using a pair of DICOM adapters 1702A, 1702B.

In at least one embodiment, deployment system 1606 may execute deployment pipeline(s) 1710. In at least one embodiment, deployment pipeline(s) 1710 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, deployment pipeline(s) 1710 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1710 depending on information desired from data generated by a device. In at least one embodiment, where detections of anomalies are desired from an MRI machine, there may be a first deployment pipeline(s) 1710, and where image enhancement is desired from output of an MRI machine, there may be a second deployment pipeline(s) 1710.

In at least one embodiment, an image generation application may include a processing task that includes use of a machine learning model. In at least one embodiment, a user may desire to use their own machine learning model, or to select a machine learning model from model registry 1624. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1700—such as services 1620 and hardware 1622—deployment pipeline(s) 1710 may be even more user friendly, provide for easier integration, and produce more accurate, efficient, and timely results.

In at least one embodiment, deployment system 1606 may include a user interface ("UI") 1714 (e.g., a graphical user interface, a web interface, etc.) that may be used to select applications for inclusion in deployment pipeline(s) 1710, arrange applications, modify or change applications or parameters or constructs thereof, use and interact with deployment pipeline(s) 1710 during set-up and/or deployment, and/or to otherwise interact with deployment system 1606. In at least one embodiment, although not illustrated with respect to training system 1604, UI 1714 (or a different user interface) may be used for selecting models for use in deployment system 1606, for selecting models for training, or retraining, in training system 1604, and/or for otherwise interacting with training system 1604.

In at least one embodiment, pipeline manager 1712 may be used, in addition to an application orchestration system 1728, to manage interaction between applications or containers of deployment pipeline(s) 1710 and services 1620 and/or hardware 1622. In at least one embodiment, pipeline manager 1712 may be configured to facilitate interactions from application to application, from application to services 1620, and/or from application or service to hardware 1622. In at least one embodiment, although illustrated as included in software 1618, this is not intended to be limiting, and in some examples pipeline manager 1712 may be included in services 1620. In at least one embodiment, application orchestration system 1728 (e.g., Kubernetes, DOCKER, etc.) may include a container orchestration system that may group applications into containers as logical units for coordination, management, scaling, and deployment. In at least one embodiment, by associating applications from deployment pipeline(s) 1710 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1712 and application orchestration system 1728. In at least one embodiment, so long as an expected input and/or output of each container or application is known by a system (e.g., based on constructs of applications or containers), application orchestration system 1728 and/or pipeline manager 1712 may facilitate communication among and between, and sharing of resources among and between, each of applications or containers. In at least one embodiment, because one or more of applications or containers in deployment pipeline(s) 1710 may share same services and resources, application orchestration system 1728 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1728) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1620 leveraged by and shared by applications or containers in deployment system 1606 may include compute service(s) 1716, AI service(s) 1718, visualization service(s) 1720, and/or other service types. In at least one embodiment, applications may call (e.g., execute) one or more of services 1620 to perform processing operations for an application. In at least one embodiment, compute service(s) 1716 may be leveraged by applications to perform super-computing or other high-performance computing (HPC) tasks. In at least one embodiment, compute service(s) 1716 may be leveraged to perform parallel processing (e.g., using a parallel computing platform 1730) for processing data through one or more of applications and/or one or more tasks of a single application, substantially simultaneously. In at least one embodiment, parallel computing platform 1730 (e.g., NVIDIA's CUDA) may allow general purpose computing on GPUs (GPGPU) (e.g., GPUs/Graphics 1722). In at least one embodiment, a software layer of parallel computing platform 1730 may provide access to virtual instruction sets and parallel computational elements of GPUs, for execution of compute kernels. In at least one embodiment, parallel computing platform 1730 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1730 (e.g., where multiple different stages of an application or multiple applications are processing same Information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1718 may be leveraged to perform inferencing services for executing machine learning model(s) associated with applications (e.g., tasked with performing one or more processing tasks of an application). In at least one embodiment, AI service(s) 1718 may leverage AI system 1724 to execute machine learning model(s) (e.g., neural networks, such as CNNs) for segmentation, reconstruction, object detection, feature detection, classification, and/or other inferencing tasks. In at least one embodiment, applications of deployment pipeline(s) 1710 may use one or more of output model(s) 1616 from training system 1604 and/or other models of applications to perform inference on imaging data. In at least one embodiment, two or more examples of inferencing using application orchestration system 1728 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1728 may distribute resources (e.g., services 1620 and/or hardware 1622) based on priority paths for different inferencing tasks of AI service(s) 1718.

In at least one embodiment, shared storage may be mounted to AI service(s) 1718 within system 1700. In at least one embodiment, shared storage may operate as a cache (or other storage device type) and may be used to process inference requests from applications. In at least one embodiment, when an inference request is submitted, a request may be received by a set of API instances of deployment system 1606, and one or more instances may be selected (e.g., for best fit, for load balancing, etc.) to process a request. In at least one embodiment, to process a request, a request may be entered into a database, a machine learning model may be located from model registry 1624 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1712) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1620 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1726, and an inference service may perform inferencing on a GPU.

In at least one embodiment, visualization service(s) 1720 may be leveraged to generate visualizations for viewing outputs of applications and/or deployment pipeline(s) 1710. In at least one embodiment, GPUs/Graphics 1722 may be leveraged by visualization service(s) 1720 to generate visualizations. In at least one embodiment, rendering effects, such as ray-tracing, may be implemented by visualization service(s) 1720 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1720 may include an internal visualizer, cinematics, and/or other rendering or image processing capabilities or functionality (e.g., ray tracing, rasterization, internal optics, etc.).

In at least one embodiment, hardware 1622 may include GPUs/Graphics 1722, AI system 1724, cloud 1726, and/or any other hardware used for executing training system 1604 and/or deployment system 1606. In at least one embodiment, GPUs/Graphics 1722 (e.g., NVIDIA's TESLA and/or QUADRO GPUs) may include any number of GPUs that may be used for executing processing tasks of compute service(s) 1716, AI service(s) 1718, visualization service(s) 1720, other services, and/or any of features or functionality of software 1618. For example, with respect to AI service(s) 1718, GPUs/Graphics 1722 may be used to perform pre-processing on imaging data (or other data types used by machine learning models), post-processing on outputs of machine learning models, and/or to perform inferencing (e.g., to execute machine learning models). In at least one embodiment, cloud 1726, AI system 1724, and/or other components of system 1700 may use GPUs/Graphics 1722. In at least one embodiment, cloud 1726 may include a GPU-optimized platform for deep learning tasks. In at least one embodiment, AI system 1724 may use GPUs, and cloud 1726—or at least a portion tasked with deep learning or inferencing—may be executed using one or more AI systems 1724. As such, although hardware 1622 is illustrated as discrete components, this is not intended to be limiting, and any components of hardware 1622 may be combined with, or leveraged by, any other components of hardware 1622.

In at least one embodiment, AI system 1724 may include a purpose-built computing system (e.g., a super-computer or an HPC) configured for inferencing, deep learning, machine learning, and/or other artificial intelligence tasks. In at least one embodiment, AI system 1724 (e.g., NVIDIA's DGX) may include GPU-optimized software (e.g., a software stack) that may be executed using a plurality of GPUs/Graphics 1722, in addition to CPUs, RAM, storage, and/or other components, features, or functionality. In at least one embodiment, one or more AI systems 1724 may be implemented in cloud 1726 (e.g., in a data center) for performing some or all of AI-based processing tasks of system 1700.

In at least one embodiment, cloud 1726 may include a GPU-accelerated infrastructure (e.g., NVIDIA's NGC) that may provide a GPU-optimized platform for executing processing tasks of system 1700. In at least one embodiment, cloud 1726 may include an AI system 1724 for performing one or more of AI-based tasks of system 1700 (e.g., as a hardware abstraction and scaling platform). In at least one embodiment, cloud 1726 may integrate with application orchestration system 1728 leveraging multiple GPUs to allow seamless scaling and load balancing between and among applications and services 1620. In at least one embodiment, cloud 1726 may tasked with executing at least some of services 1620 of system 1700, including compute service(s) 1716, AI service(s) 1718, and/or visualization service(s) 1720, as described herein. In at least one embodiment, cloud 1726 may perform small and large batch inference (e.g., executing NVIDIA's TENSOR RT), provide an accelerated parallel computing API and platform 1730 (e.g., NVIDIA's CUDA), execute application orchestration system 1728 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1700.

Figure 18A:
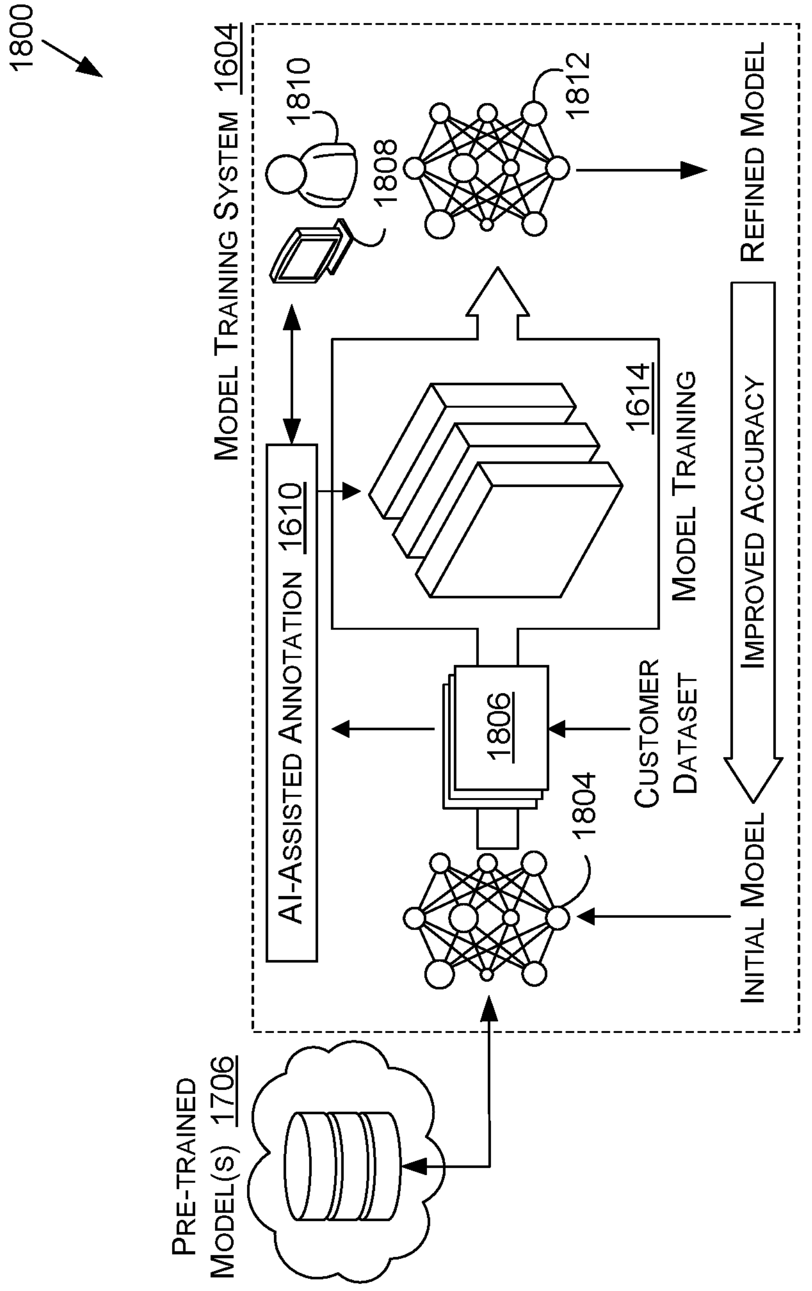
FIGS. 18A and 18B illustrate a data flow diagram for a process to train a machine learning model, as well as client-server architecture to enhance annotation tools with pre-trained annotation models, in accordance with at least one embodiment.

FIG. 18A illustrates a data flow diagram for a process 1800 to train, retrain, or update a machine learning model, in accordance with at least one embodiment. In at least one embodiment, process 1800 may be executed using, as a non-limiting example, system 1700 of FIG. 17. In at least one embodiment, process 1800 may leverage services and/or hardware as described herein. In at least one embodiment, refined model 1812 generated by process 1800 may be executed by a deployment system for one or more containerized applications in deployment pipelines.

In at least one embodiment, model training 1814 may include retraining or updating an initial model 1804 (e.g., a pre-trained model) using new training data (e.g., new input data, such as customer dataset 1806, and/or new ground truth data associated with input data). In at least one embodiment, to retrain, or update, initial model 1804, output or loss layer(s) of initial model 1804 may be reset, or deleted, and/or replaced with an updated or new output or loss layer(s). In at least one embodiment, initial model 1804 may have previously fine-tuned parameters (e.g., weights and/or biases) that remain from prior training, so training or retraining 1814 may not take as long or require as much processing as training a model from scratch. In at least one embodiment, during model training 1814, by having reset or replaced output or loss layer(s) of initial model 1804, parameters may be updated and re-tuned for a new data set based on loss calculations associated with accuracy of output or loss layer(s) at generating predictions on new, customer dataset 1806.

In at least one embodiment, pre-trained models 1806 may be stored in a data store, or registry. In at least one embodiment, pre-trained models 1806 may have been trained, at least in part, at one or more facilities other than a facility executing process 1800. In at least one embodiment, to protect privacy and rights of patients, subjects, or clients of different facilities, pre-trained models 1806 may have been trained, on-premise, using customer or patient data generated on-premise. In at least one embodiment, pre-trained models 1806 may be trained using a cloud and/or other hardware, but confidential, privacy protected patient data may not be transferred to, used by, or accessible to any components of a cloud (or other off premise hardware). In at least one embodiment, where pre-trained models 1806 is trained at using patient data from more than one facility, pre-trained models 1806 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1806 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1806 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1804 for a training system within process 1800. In at least one embodiment, a customer dataset 1806 (e.g., imaging data, genomics data, sequencing data, or other data types generated by devices at a facility) may be used to perform model training (which may include, without limitation, transfer learning) on initial model 1804 to generate refined model 1812. In at least one embodiment, ground truth data corresponding to customer dataset 1806 may be generated by training system 1604. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1810 may interact with a GUI via computing device 1808 to edit or fine-tune (auto) annotations. In at least one embodiment, a polygon editing feature may be used to move vertices of a polygon to more accurate or fine-tuned locations.

In at least one embodiment, once customer dataset 1806 has associated ground truth data, ground truth data (e.g., from AI-assisted annotation, manual labeling, etc.) may be used by during model training to generate refined model 1812. In at least one embodiment, customer dataset 1806 may be applied to initial model 1804 any number of times, and ground truth data may be used to update parameters of initial model 1804 until an acceptable level of accuracy is attained for refined model 1812. In at least one embodiment, once refined model 1812 is generated, refined model 1812 may be deployed within one or more deployment pipelines at a facility for performing one or more processing tasks with respect to medical imaging data.

In at least one embodiment, refined model 1812 may be uploaded to pre-trained models in a model registry to be selected by another facility. In at least one embodiment, this process may be completed at any number of facilities such that refined model 1812 may be further refined on new datasets any number of times to generate a more universal model.

Figure 18B:
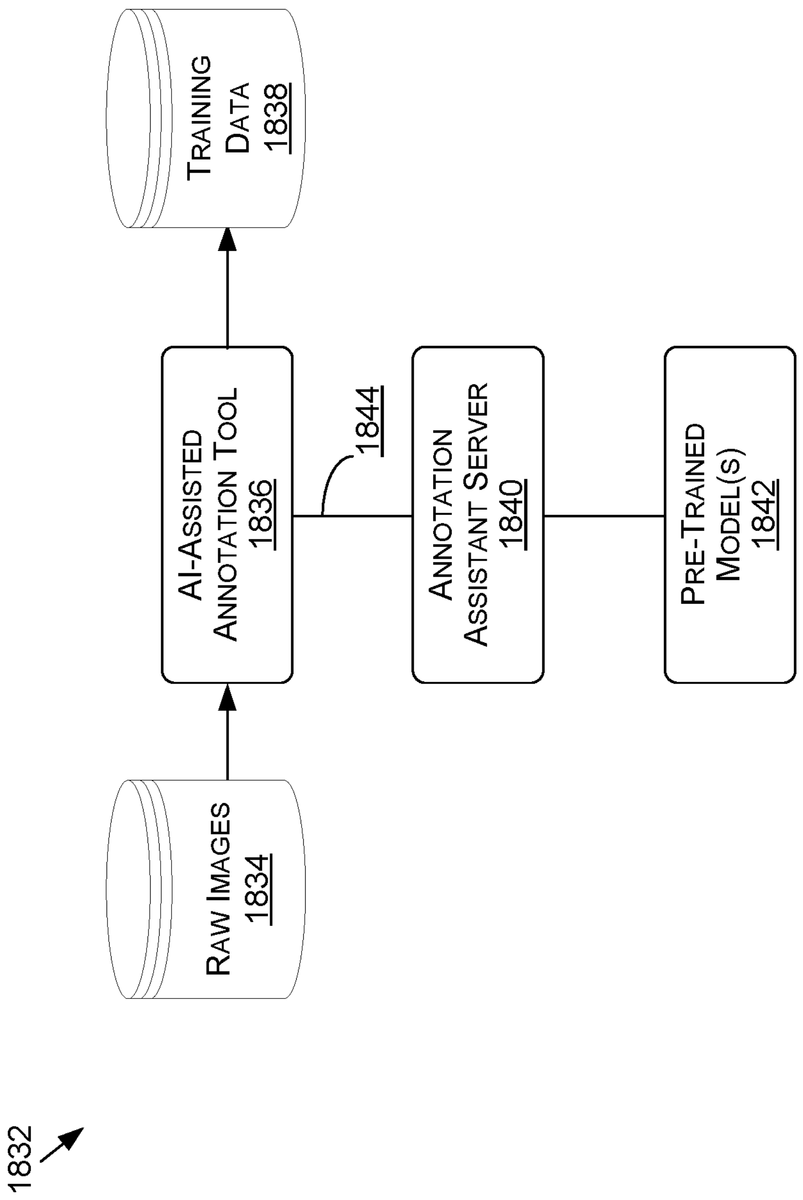

FIG. 18B is an example illustration of a client-server architecture 1832 to enhance annotation tools with pre-trained annotation models, in accordance with at least one embodiment. In at least one embodiment, AI-assisted annotation tool 1836 may be instantiated based on a client-server architecture 1832. In at least one embodiment, annotation tool 1836 in imaging applications may aid radiologists, for example, identify organs and abnormalities. In at least one embodiment, imaging applications may include software tools that help user 1810 to identify, as a non-limiting example, a few extreme points on a particular organ of interest in raw images 1834 (e.g., in a 3D MRI or CT scan) and receive auto-annotated results for all 2D slices of a particular organ. In at least one embodiment, results may be stored in a data store as training data 1838 and used as (for example and without limitation) ground truth data for training. In at least one embodiment, when computing device 1808 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1836 in FIG. 18B, may be enhanced by making API calls (e.g., API Call 1844) to a server, such as an Annotation Assistant Server 1840 that may include a set of pre-trained model(s) 1842 stored in an annotation model registry, for example. In at least one embodiment, an annotation model registry may store pre-trained model(s) 1842 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
   identifying a region of interest (ROI) associated with a first object in an image;
   generating, using pixel data from the ROI applied as input to a generative model, image data for a second object, the image data for the second object being generated based at least on one or more of a segmentation mask for the first object, a depth map for the image, or input specifying at least one aspect of the second object; and
   inserting the image data for the second object into the ROI of the image to cause the first object to be replaced with the second object in the image.

2. The computer-implemented method of clause 1, further comprising:
   identifying a second ROI associated with a third object in the image;
   generating, using pixel data from the second ROI applied as input to the generative diffusion model, image data for a fourth object, the image data for the fourth object being generated based at least on one or more of a segmentation mask for the third object, a depth map for the image, or input specifying at least one aspect of the fourth object; and
   inserting, after the inserting of the image data for the second object, the image data for the fourth object into the second ROI of the image to cause the third object to be replaced with the fourth object in the image.

3. The computer-implemented method of clause 1, further comprising generating a second image by extracting pixel data for the ROI from the image, wherein the second image is used as input to the generative model.

4. The computer-implemented method of clause 3, wherein resolution of the extracted second image is adjusted before being passed to the generative model.

5. The computer-implemented method of clause 1, wherein the input specifying at least one aspect of the second object is one or more of text prompt, style code, gesture input, or speech input.

6. The computer-implemented method of clause 1, wherein the at least one aspect of the second object corresponds to one or more of object type, object style, or object appearance.

7. The computer-implemented method of clause 1, wherein the inserting further comprises blending the image data for the second object into a background of the image in the ROI.

8. The computer-implemented method of clause 1, wherein a second machine learning model is used to compute monocular depth information from the input image.

9. A processor, comprising:
   one or more circuits to:
   - identify a region of interest (ROI) associated with a first object in an image;
   - generate, using pixel data from the ROI applied as input to a machine learning model, image data for a second object, the image data for the second object being generated based at least on one or more of a segmentation mask for the first object, a depth map for the image, or input specifying at least one aspect of the second object; and
   - insert the image data for the second object into the ROI of the image to the first object to be replaced with the second object in the image.

10. The processor of clause 9, wherein the one or more circuits further to:

identify a second ROI associated with a third object in the image;

generate, using pixel data from the second ROI applied as input to the machine learning model, image data for a fourth object, the image data for the fourth object being generated based at least on one or more of a segmentation mask for the third object, a depth map for the image, and input specifying at least one aspect of the fourth object; and insert, after the inserting of the image data for the second object, the image data for the fourth object into the second ROI of the image to cause the third object to be replaced with the fourth object in the image.

11. The processor of clause 9, wherein the one or more circuits further to generate a second image by extracting the ROI from the image, wherein the second image is used as input for the machine learning model.

12. The processor of clause 11, wherein resolution of the extracted second image is adjusted before being passed to the machine learning model.

13. The processor of clause 9, wherein the input specifying at least one aspect of the second object is one or more of text prompt, style code, gesture input, or speech input.

14. The processor of clause 9, wherein the at least one aspect of the second object corresponds to one or more of object type, object style, or object appearance.

15. The processor of clause 9, wherein the inserting further comprises blending the image data for the second object into a background of the image.

16. The processor of clause 9, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for performing operations using one or more language models;

a system for performing generative AI operations;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

17. A system, comprising:

one or more processers to replace a first object in a synthetic image using a second object generated by a generative diffusion model, the generating being based at least on one or more of a segmentation mask for the first object, a depth map for the synthetic image, or input specifying at least one aspect of the second object.

18. The system of clause 17, wherein to replace the first object in the synthetic image using the second object, the one or more processors are further to:

identify a region of interest (ROI) associated with a first object in an input image;

generate, using pixel data from the ROI applied as input to a machine learning model, image data for a second object, the image data for the second object being generated based at least on one or more of a segmentation mask for the first object, a depth map for the input image, or input specifying at least one aspect of the second object; and insert the image data for the second object into the ROI of the image to the first object in the input image to be replaced with the second object.

19. The system of clause 17, wherein the one or more processors are further to:

identify a second ROI associated with a third object in the input image;

generate, using pixel data from the second ROI applied as input to the machine learning model, image data for a fourth object, the image data for the fourth object being generated based at least on one or more of a segmentation mask for the third object, a depth map for the input image, or input specifying at least one aspect of the fourth object; and insert, after the inserting of the image data for the second object, the image data for the fourth object into the second ROI of the image to cause the third object in the input image to be replaced with the fourth object.

20. The system of clause 17, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing operations using one or more language models;

a system for performing generative AI operations;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

identifying a region of interest (ROI) associated with a first object in an image;

generating, using a generative model and based on pixel data from the ROI and one or more of a segmentation mask for the first object, a depth map for the image, or an input specifying at least one aspect of a second object, image data for the second object independently of pixel data outside the ROI; and inserting the image data for the second object into the ROI of the image to cause the first object to be replaced with the second object in the image.

2. The computer-implemented method of claim 1, further comprising:

identifying a second ROI associated with a third object in the image;

generating, using pixel data from the second ROI applied as input to the generative model, image data for a fourth object, the image data for the fourth object being generated based at least on one or more of a segmentation mask for the third object, a depth map for the image, or input specifying at least one aspect of the fourth object; and inserting, after the inserting of the image data for the second object, the image data for the fourth object into the second ROI of the image to cause the third object to be replaced with the fourth object in the image.

3. The computer-implemented method of claim 1, further comprising generating a second image by extracting pixel data for the ROI from the image, wherein the second image is used as input to the generative model.

4. The computer-implemented method of claim 3, wherein resolution of the extracted second image is adjusted before being passed to the generative model.

5. The computer-implemented method of claim 1, wherein the input specifying at least one aspect of the second object is one or more of text prompt, style code, gesture input, or speech input.

6. The computer-implemented method of claim 1, wherein the at least one aspect of the second object corresponds to one or more of object type, object style, or object appearance.

7. The computer-implemented method of claim 1, wherein the inserting further comprises blending the image data for the second object into a background of the image in the ROI.

8. The computer-implemented method of claim 1, wherein a second machine learning model is used to compute monocular depth information from the image.

9. A processor, comprising:

one or more circuits to:

identify a region of interest (ROI) associated with a first object in an image;

generate, using a machine learning model and based on pixel data from the ROI and one or more of a segmentation mask for the first object, a depth map for the image, or an input specifying at least one aspect of a second object, image data for the second object independently of pixel data outside the ROI; and insert the image data for the second object into the ROI of the image to the first object to be replaced with the second object in the image.

10. The processor of claim 9, wherein the one or more circuits further to:

identify a second ROI associated with a third object in the image;

generate, using pixel data from the second ROI applied as input to the machine learning model, image data for a fourth object, the image data for the fourth object being generated based at least on one or more of a segmentation mask for the third object, a depth map for the image, and input specifying at least one aspect of the fourth object; and insert, after the inserting of the image data for the second object, the image data for the fourth object into the second ROI of the image to cause the third object to be replaced with the fourth object in the image.

11. The processor of claim 9, wherein the one or more circuits further to generate a second image by extracting the ROI from the image, wherein the second image is used as input for the machine learning model.

12. The processor of claim 11, wherein resolution of the extracted second image is adjusted before being passed to the machine learning model.

13. The processor of claim 9, wherein the input specifying at least one aspect of the second object is one or more of text prompt, style code, gesture input, or speech input.

14. The processor of claim 9, wherein the at least one aspect of the second object corresponds to one or more of object type, object style, or object appearance.

15. The processor of claim 9, wherein the inserting further comprises blending the image data for the second object into a background of the image.

16. The processor of claim 9, wherein the processor is comprised in at least one of:

- a system for performing simulation operations;
- a system for performing simulation operations to test or validate autonomous machine applications;
- a system for performing digital twin operations;
- a system for performing light transport simulation;
- a system for rendering graphical output;
- a system for performing deep learning operations;
- a system implemented using an edge device;
- a system for performing operations using one or more language models;
- a system for performing generative AI operations;
- a system for generating or presenting virtual reality (VR) content;
- a system for generating or presenting augmented reality (AR) content;
- a system for generating or presenting mixed reality (MR) content;
- a system incorporating one or more Virtual Machines (VMs);
- a system implemented at least partially in a data center;
- a system for performing hardware testing using simulation;
- a system for synthetic data generation;
- a collaborative content creation platform for 3D assets; or
- a system implemented at least partially using cloud computing resources.

17. A system, comprising:

one or more processors to replace a first object in a synthetic image using a second object generated by a generative diffusion model using pixel data associated with the first object as input, exclusive of pixel data associated with other portions of the synthetic image, the generating being based at least on one or more of a segmentation mask for the first object, a depth map for the synthetic image, or input specifying at least one aspect of the second object.

18. The system of claim 17, wherein to replace the first object in the synthetic image using the second object, the one or more processors are further to:

identify a region of interest (ROI) associated with a first object in an input image;

generate, using pixel data from the ROI applied as input to a machine learning model, image data for a second object, the image data for the second object being generated based at least on one or more of a segmentation mask for the first object, a depth map for the input image, or input specifying at least one aspect of the second object; and insert the image data for the second object into the ROI of the image to the first object in the input image to be replaced with the second object.

19. The system of claim 17, wherein the one or more processors are further to:

identify a second ROI associated with a third object in the synthetic image;

generate, using pixel data from the second ROI applied as input to the generative diffusion model, image data for a fourth object, the image data for the fourth object being generated based at least on one or more of a segmentation mask for the third object, a depth map for the synthetic image, or input specifying at least one aspect of the fourth object; and insert, after the inserting of the image data for the second object, the image data for the fourth object into the second ROI of the image to cause the third object in the synthetic image to be replaced with the fourth object.

20. The system of claim 17, wherein the system comprises at least one of:

- a system for performing simulation operations;
- a system for performing simulation operations to test or validate autonomous machine applications;
- a system for performing digital twin operations;
- a system for performing light transport simulation;
- a system for rendering graphical output;
- a system for performing operations using one or more language models;
- a system for performing generative AI operations;
- a system for performing deep learning operations;
- a system implemented using an edge device;
- a system for generating or presenting virtual reality (VR) content;
- a system for generating or presenting augmented reality (AR) content;
- a system for generating or presenting mixed reality (MR) content;
- a system incorporating one or more Virtual Machines (VMs);
- a system implemented at least partially in a data center;
- a system for performing hardware testing using simulation;
- a system for synthetic data generation;
- a collaborative content creation platform for 3D assets; or
- a system implemented at least partially using cloud computing resources.

* * * * *